(12) United States Patent
Yoshida et al.

(10) Patent No.: US 8,512,907 B2
(45) Date of Patent: Aug. 20, 2013

(54) MEMBRANE CATALYST LAYER ASSEMBLY WITH REINFORCING FILMS, MEMBRANE ELECTRODE ASSEMBLY WITH REINFORCING FILMS, AND POLYMER ELECTROLYTE FUEL CELLS

(75) Inventors: Aki Yoshida, Tokyo (JP); Masashi Hiromitsu, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 303 days.

(21) Appl. No.: 12/232,637

(22) Filed: Sep. 22, 2008

(65) Prior Publication Data
US 2009/0087713 A1    Apr. 2, 2009

(30) Foreign Application Priority Data

| Sep. 27, 2007 | (JP) | 2007-251346 |
| Sep. 27, 2007 | (JP) | 2007-251414 |
| Sep. 27, 2007 | (JP) | 2007-251443 |
| Nov. 26, 2007 | (JP) | 2007-304467 |
| Jan. 28, 2008 | (JP) | 2008-16006 |
| Aug. 18, 2008 | (JP) | 2008-209768 |
| Aug. 20, 2008 | (JP) | 2008-211433 |
| Aug. 20, 2008 | (JP) | 2008-211439 |

(51) Int. Cl.
*H01M 8/10* (2006.01)
(52) U.S. Cl.
USPC ...................................................... 429/483
(58) Field of Classification Search
USPC ...................................................... 429/483
See application file for complete search history.

(56) References Cited

U.S. PATENT DOCUMENTS

| 6,495,278 B1 * | 12/2002 | Schmid et al. ................. 429/465 |
| 2003/0091885 A1 | 5/2003 | Kobayashi et al. |
| 2007/0065705 A1 * | 3/2007 | Boucher et al. ................. 429/35 |
| 2007/0134538 A1 | 6/2007 | Yuichi et al. |

(Continued)

FOREIGN PATENT DOCUMENTS

| JP | 05-242897 | 9/1993 |
| JP | 08-045517 A | 2/1996 |

(Continued)

OTHER PUBLICATIONS

List of Publications, citing patents document from an Office Action of a corresponding Japanese Application, dated Nov. 20, 2012, 1 page, entire document.

(Continued)

*Primary Examiner* — Ula C Ruddock
*Assistant Examiner* — Frank Chernow
(74) *Attorney, Agent, or Firm* — Fitch, Even, Tabin & Flannery, LLP

(57) ABSTRACT

A membrane-catalyst layer assembly with reinforcing films including a solid polymer electrolyte membrane 2, a catalyst layer 3 formed on each surface of the electrolyte membrane 2, and a reinforcing film 4 located on each surface of a membrane-catalyst layer assembly having the electrolyte membrane and the catalyst layers. Each of the reinforcing films 4 has a frame shape with a central opening 41. Each of the catalyst layers 3, except for an outer edge portion 31, is exposed through the opening 41. Each reinforcing film 4 has a first bonding layer 43 bonded to a membrane-catalyst layer assembly 10, and a gas barrier layer 42 formed on the first bonding layer 43 to prevent passage of a fuel gas and an oxidant gas.

8 Claims, 15 Drawing Sheets

(56) References Cited

U.S. PATENT DOCUMENTS

| | | |
|---|---|---|
| 2007/0190400 A1 | 8/2007 | Buche et al. |
| 2007/0196718 A1* | 8/2007 | Leistra et al. ............ 429/36 |
| 2011/0308726 A1 | 12/2011 | Zuber et al. |

FOREIGN PATENT DOCUMENTS

| | | |
|---|---|---|
| JP | 10-154521 | 6/1998 |
| JP | 2001-15127 | 1/2001 |
| JP | 2003-068318 A | 3/2003 |
| JP | 2004-47230 | 2/2004 |
| JP | 2004134392 A | 4/2004 |
| JP | 3690682 B2 | 8/2005 |
| JP | 2006179298 A | 7/2006 |
| JP | 2006210234 A | 8/2006 |
| JP | 2006-338939 A | 12/2006 |
| JP | 2006338938 A | 12/2006 |
| JP | 2006338940 A | 12/2006 |
| JP | 2006338943 A | 12/2006 |
| JP | 2006339840 A | 12/2006 |
| JP | 2007503688 A | 2/2007 |
| JP | 2007-157420 A | 6/2007 |
| JP | 2007188718 A | 7/2007 |
| JP | 2008-71542 | 3/2008 |
| JP | 2008-146915 | 6/2008 |
| WO | 2006/032894 A2 | 3/2006 |

OTHER PUBLICATIONS

List of Publications, citing patents document from an Office Action of a corresponding Japanese Application, dated Dec. 18, 2012, 1 page, entire document.

* cited by examiner

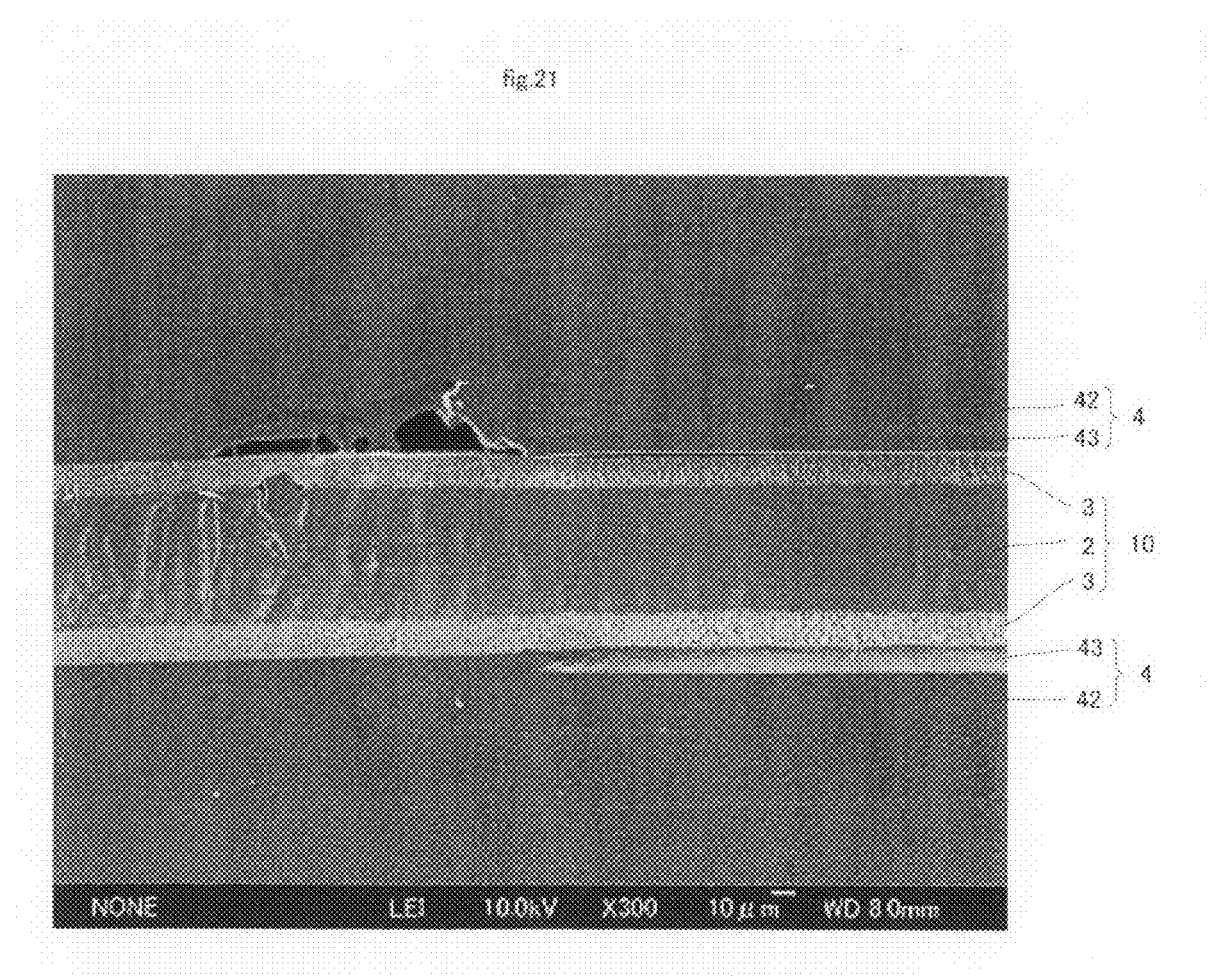

MEMBRANE CATALYST LAYER ASSEMBLY WITH REINFORCING FILMS, MEMBRANE ELECTRODE ASSEMBLY WITH REINFORCING FILMS, AND POLYMER ELECTROLYTE FUEL CELLS

CROSS-REFERENCE TO RELATED APPLICATIONS

This application claims the benefit of foreign priority under 35 U.S.C. §119 based on JP 2007-251346, JP 2007-251414, and JP 2007-251443, filed Sep. 27, 2007; JP 2007-304467, filed Nov. 26, 2007; JP 2008-16006, filed Jan. 28, 2008; JP 2008-209768, filed Aug. 18, 2008; and 2008-211433 and 2008-211439, filed Aug. 20, 2008. The entire disclosures of the preceding applications are hereby incorporated herein by reference.

BACKGROUND OF THE INVENTION (1) Field of the Invention

The present invention relates to a membrane-catalyst layer assembly with reinforcing films, a membrane electrode assembly with reinforcing films, and polymer electrolyte fuel cells.

(2) Description of the Related Art

Fuel cells include electrodes on both surfaces of an electrolyte, and generate power utilizing the electrochemical reaction between hydrogen and oxygen, thus producing only water during the generation of power. Unlike conventional internal combustion engines, fuel cells do not emit environmentally harmful gases such as carbon dioxide and the like, and are therefore expected to prevail as next-generation clean energy systems. Among these fuel cells, polymer electrolyte fuel cells, in particular, have low operating temperatures and low electrolyte resistance, and provide high power while being small because they use highly activated catalysts. For this reason, polymer electrolyte fuel cells are expected to be in practical use soon as cogeneration systems for household use and the like.

These polymer electrolyte fuel cells include a proton-conducting solid polymer electrolyte membrane, and a catalyst layer and a gas diffusion layer, which are smaller in size than the electrolyte membrane, formed in this order on each surface of the electrolyte membrane. In addition, gaskets are located on the electrolyte membrane so as to surround the electrodes each having the catalyst layer and gas diffusion layer, and the electrodes are sandwiched between separators (see, for example, FIG. 2 of Japanese Patent No. 3,052,536). In view of the accuracy of positioning, the gaskets are located to surround the outside of the electrodes, resulting in a gap being formed between each gasket and electrode. The portions of the electrolyte membrane corresponding to these gap portions are constrained by neither the electrodes nor gaskets. Thus, when the polymer electrolyte fuel cells repeatedly generate or do not generate power to subject the electrolyte membrane to repeated moist and dry states, the portions of the electrolyte membrane corresponding to the gap portions experience repeated expansion and shrinkage. As a result, the electrolyte membrane may become worn, and ultimately be broken.

In order to overcome this problem, the polymer electrolyte fuel cell disclosed in, for example, Japanese Patent No. 3,052, 536 further includes frame-shaped reinforcing films. These reinforcing films are bonded to the above-described gap portions of the electrolyte membrane. An outer edge portion of each reinforcing film is sandwiched between a gasket and an electrolyte membrane, and an inner edge portion of each reinforcing film is sandwiched between a separator and a gas diffusion layer. In this manner, the polymer electrolyte fuel cell of Japanese Patent No. 3,052,536 uses the reinforcing films to confine the gap portions between the gaskets and the electrodes, thereby preventing expansion and shrinkage of the electrolyte membrane.

In some cases, reinforcing films are provided for a reason different from that described above. In polymer electrolyte fuel cells without the above-described reinforcing films, gaskets are located on outer edge portions of an electrolyte membrane. However, the outer edge portions of the electrolyte membrane provided with the gaskets do not contribute to the generation of power, thus preventing effective use of the electrolyte membrane.

In order to overcome this problem, the polymer electrolyte fuel cell disclosed in FIG. 1 of Japanese Unexamined Patent Publication No. 2004-47230, for example, includes an electrolyte membrane, a catalyst layer formed on the entirety of each surface of the electrolyte membrane, and a gas diffusion layer disposed on each catalyst layer. To provide gaskets, separate reinforcing films are formed to extend outward from the outer edges of the membrane electrode assembly. The formation of separate reinforcing films and the location of the gaskets on the reinforcing films eliminate the portions of the electrolyte membrane that do not contribute to the generation of power.

However, the above-described reinforcing films of the polymer electrolyte fuel cells do not provide sufficient gas barrier properties, because they are formed of a single layer of a polyolefin resin such as polypropylene resin, polyethylene resin or the like. For this reason, a fuel gas supplied to the anode side may leak to the cathode side via the reinforcing film, or an oxidant gas supplied to the cathode side may leak to the anode side via the reinforcing film.

Accordingly, an object of the invention is to provide a membrane-catalyst layer assembly with reinforcing films, a membrane electrode assembly with reinforcing films, and polymer electrolyte fuel cells, which exhibit sufficient gas barrier properties.

SUMMARY OF THE INVENTION

A membrane-catalyst layer assembly with reinforcing films according to a first aspect of the invention includes a solid polymer electrolyte membrane; a catalyst layer formed on each surface of the electrolyte membrane; and a reinforcing film located on each surface of a membrane-catalyst layer assembly having the electrolyte membrane and the catalyst layers. The reinforcing films have a frame shape with a central opening, through which each of the catalyst layers is exposed except for an outer edge portion thereof. Each of the reinforcing films has a first bonding layer and a gas barrier layer formed on the first bonding layer. The first bonding layer is bonded to the membrane-catalyst layer assembly. The gas barrier layer is configured to prevent passage of a fuel gas and an oxidant gas.

With this structure, the first bonding layer of each reinforcing film ensures that the reinforcing film is bonded to the membrane-catalyst layer assembly via the first bonding layer. Moreover, the gas barrier layer of each reinforcing film can prevent a fuel gas and an oxidant gas used by the fuel cell to generate power from leaking to the outside or to the opposite-side electrode via the reinforcing film.

The above-described membrane-catalyst layer assembly with reinforcing films in accordance with the first aspect of the invention can employ various structures. For example, the first bonding layers may be adhesive-bonded to the membrane-catalyst layer assembly. When the reinforcing films are adhesive-bonded to the membrane-catalyst layer assembly, the pressure applied to the reinforcing films during bonding can be reduced, as compared to when the reinforcing films are bonded to the membrane-catalyst layer assembly by welding. This can prevent the reinforcing films from sinking into the electrolyte membrane or catalyst layers, thereby preventing the mechanical strength of the electrolyte membrane or catalyst layers from decreasing.

Each of the reinforcing films may further have a second bonding layer formed on the gas barrier layer, and a gasket may be bonded on the second bonding layer. This ensures that the reinforcing films are bonded to the gaskets. When each reinforcing film further has a second bonding layer, the first bonding layer and the second bonding layer are preferably bonded to either the membrane-catalyst layer assembly or gasket by welding, and the first bonding layer preferably has a melting point lower than that of the second bonding layer. When the reinforcing films are welded to the membrane-catalyst layer assembly, welding is first performed at a melting point that is higher than that of the first bonding layer, but lower than that of the second bonding layer. This enables welding of only the first bonding layers, and enables the reinforcing films to be welded to the membrane-catalyst layer assembly. After this, the second bonding layers are melted at a temperature higher than the melting point of the second bonding layers, and are thereby welded to the gaskets. This welding method can reduce the heat applied to the membrane-catalyst layer assembly, thereby reducing damage to the membrane-catalyst layer assembly by heat.

Each of the catalyst layers may be formed on each surface of the electrolyte membrane except for an outer edge portion of the electrolyte membrane, or each catalyst layer may be formed on an entirety of each surface of the electrolyte membrane.

The gas barrier layers are preferably made of a polyester resin. The first bonding layers are preferably made of a polyolefin resin, and an acid-modified polyolefin resin is preferred among polyolefin resins. The acid-modified polyolefin resin is preferably a polyethylene grafted with an unsaturated carboxylic acid, or a polypropylene grafted with an unsaturated carboxylic acid.

A membrane electrode assembly with reinforcing films in accordance with the first aspect of the invention includes the membrane-catalyst layer assembly with reinforcing films of the first aspect of the invention; and a gas diffusion layer formed on each of the catalyst layers inside the opening of each reinforcing film, and having a thickness equal to or greater than that of the reinforcing film.

A polymer electrolyte fuel cell in accordance with the first aspect of the invention includes the membrane electrode assembly with reinforcing films of the first aspect of the invention; a gasket formed on each of the reinforcing films so as to surround each electrode having the catalyst layer and the gas diffusion layer; and a separator located on each electrode and each gasket.

A membrane electrode assembly with reinforcing films in accordance with a second aspect of the invention includes a solid polymer electrolyte membrane; a catalyst layer formed on each surface of the electrolyte membrane; a gas diffusion layer formed on each of the catalyst layers; and a reinforcing film located on each surface of the membrane electrode assembly having the electrolyte membrane, catalyst layers, and gas diffusion layers. The reinforcing films have a frame shape with a central opening, through which each of the gas diffusion layers is exposed except for an outer edge portion thereof. Each of the reinforcing films has a first bonding layer bonded to the electrolyte-electrode assembly, and a gas barrier layer formed on the first bonding layer to prevent passage of a fuel gas and an oxidant gas.

With this structure, the first bonding layer of each reinforcing film ensures that the reinforcing film is bonded to the membrane-catalyst layer assembly via the first bonding layer. Moreover, the gas barrier layer of each reinforcing film can prevent a fuel gas and an oxidant gas used by the fuel cell to generate power from leaking to the outside or to the opposite-side electrode via the reinforcing film.

The membrane electrode assembly with reinforcing films in accordance with the second aspect of the invention can employ various structures. For example, the gas barrier layers are preferably made of a polyester resin.

The first bonding layers are preferably made of a polyolefin resin, and an acid-modified polyolefin resin is preferred among polyolefin resins. The acid-modified polyolefin resin is preferably a polyethylene grafted with an unsaturated carboxylic acid, or a polypropylene grafted with an unsaturated carboxylic acid.

The first bonding layers may be adhesive-bonded to the membrane electrode assembly. When the reinforcing films are adhesive-bonded to the membrane-catalyst layer assembly, the pressure applied to the reinforcing films during bonding can be reduced, as compared to when the reinforcing films are bonded to the membrane-catalyst layer assembly by welding. This can prevent the reinforcing films from sinking into the electrolyte membrane or catalyst layers, thereby preventing the mechanical strength of the electrolyte membrane or catalyst layers from decreasing.

Each of the reinforcing films may further have a second bonding layer formed on the gas barrier layer, and a gasket may be bonded on the second bonding layer. This ensures that the reinforcing films are bonded to the gaskets. When each reinforcing film also has a second bonding layer, the first bonding layer and the second bonding layer are preferably bonded to either the membrane-electrode assembly or gasket by welding, and the first bonding layer preferably has a melting point lower than that of the second bonding layer. When the reinforcing films are welded to the membrane-catalyst layer assembly, welding is first performed at a melting point that is higher than that of the first bonding layer, but lower than that of the second bonding layer. This enables welding of only the first bonding layers, and enables the reinforcing films to be welded to the membrane-catalyst layer assembly. After this, the second bonding layers are melted at a temperature higher than the melting point of the second bonding layers, and are thereby welded to the gaskets. This welding method can reduce the heat applied to the membrane-catalyst layer assembly, thereby reducing damage to the membrane-catalyst layer assembly by heat.

Each of the catalyst layers may be formed on each surface of the electrolyte membrane except for an outer edge portion of the electrolyte membrane, or each catalyst layer may be formed on an entirety of each surface of the electrolyte membrane.

A polymer electrolyte fuel cell in accordance with the second aspect of the invention includes the membrane electrode assembly with reinforcing films of the second aspect of the invention; a gasket formed on each of the reinforcing films so as to surround each electrode having the catalyst layer and the gas diffusion layer; and a separator located on each electrode and each gasket.

BRIEF DESCRIPTION OF THE DRAWINGS

FIG. 21 is a scanning electron micrograph showing a cross section of an outer edge portion of the polymer electrolyte fuel cell according to Example 11.

EXPLANATION OF THE REFERENCE NUMERALS

| | |
|---|---|
| 1 | Fuel cell |
| 2 | Electrolyte membrane |
| 3 | Catalyst layer |
| 4 | Reinforcing film |
| 41 | Opening |
| 5 | Gas diffusion layer |
| 6 | Gasket |
| 7 | Separator |
| 10 | Membrane-catalyst layer assembly |
| 20 | Membrane electrode assembly |

DESCRIPTION OF THE PREFERRED EMBODIMENTS

First Embodiment

A first embodiment is described below with reference to the drawings.

Figure 1:
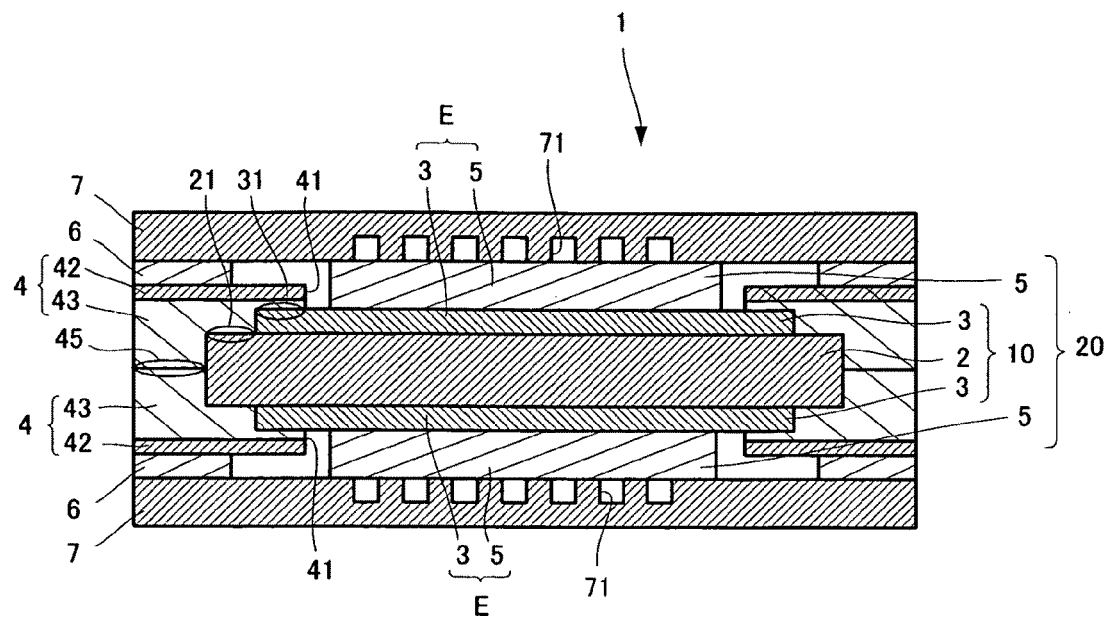
FIG. 1 is a front cross-sectional view of a polymer electrolyte fuel cell according to a first embodiment.
Figure 2:
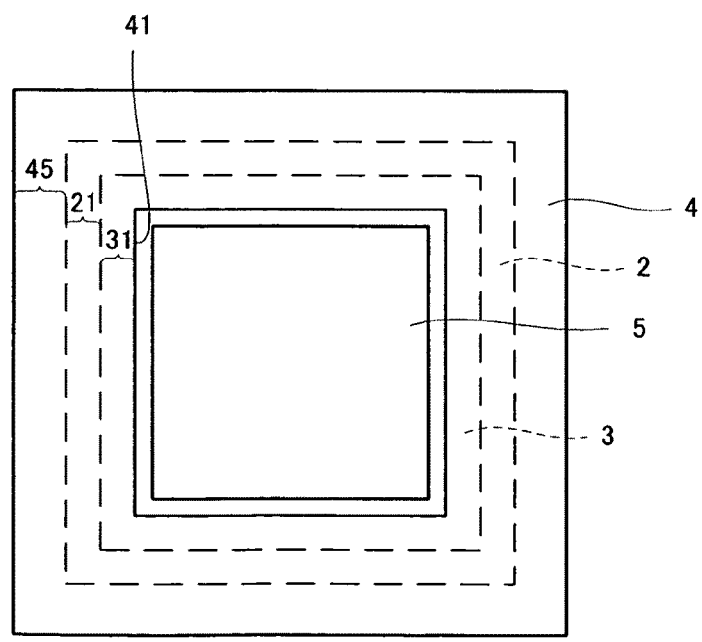
FIG. 2 is a plan view of a membrane electrode assembly with reinforcing films according to the first embodiment.
Figure 3:
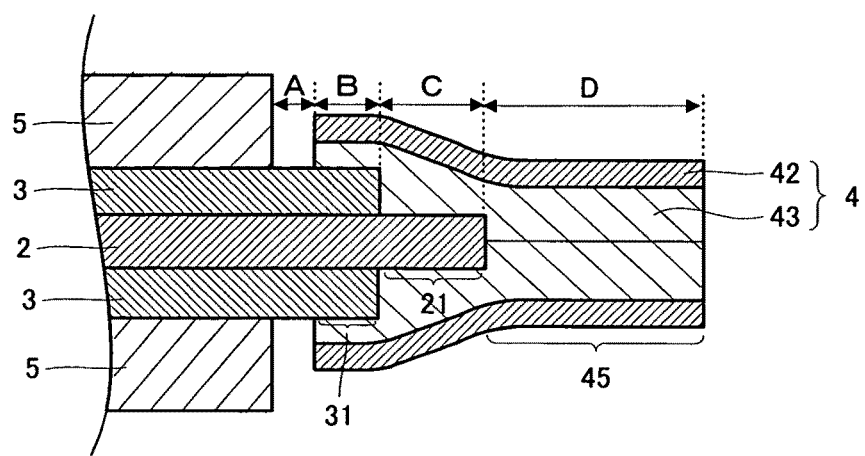
FIG. 3 is an enlarged front cross-sectional view showing in detail a portion of the outer edge of the membrane electrode assembly with reinforcing films according to the first embodiment.

As shown in FIGS. 1 and 2, a polymer electrolyte fuel cell 1 includes an electrolyte membrane 2 that is rectangular from a plan view. The electrolyte membrane 2 preferably has a thickness of from about 20 to about 250 μm, and more preferably from about 20 to about 80 μm. Catalyst layers 3, which are rectangular from a plan view, and smaller in size than the electrolyte membrane 2, are formed on upper and lower surfaces of the electrolyte membrane 2. The catalyst layers 3 preferably have a thickness of from about 10 to about 100 μm, and more preferably from about 20 to about 50 μm. The assembly wherein the catalyst layers 3 are formed on both surfaces of the electrolyte membrane 2 is referred to as a membrane-catalyst layer assembly 10. Because the catalyst layers 3 are smaller than the electrolyte membrane 2, they are not formed on outer edge portions 21 of the electrolyte membrane 2. Distance C from the outer edge of the electrolyte membrane 2 to the outer edge of each catalyst layer 3 (see FIG. 3) is preferably from about 0.1 to about 5 mm.

Frame-shaped reinforcing films 4 with a central opening 41 are welded to upper and lower surfaces of the membrane-catalyst layer assembly 10. Each reinforcing film 4 has a gas barrier layer 42 and a first bonding layer 43. The gas barrier layer 42 is configured to prevent passage of a fuel gas and an oxidant gas used by the fuel cell to generate power. The first bonding layer 43 is welded to the membrane-catalyst layer assembly 10. Each reinforcing film 4 is located so that the first bonding layer 43 faces the membrane-catalyst layer assembly 10. The gas barrier layer 42 preferably has a thickness of from about 5 to about 50 μm, and the first bonding layer 43 preferably has a thickness of from about 1 to about 50 μm. With the reinforcing films 4 welded to the membrane-catalyst layer assembly 10, each of the first bonding layers 43 is welded to an outer edge portion 31 of each catalyst layer 3 and an outer edge portion 21 of the electrolyte 2. Through the opening 41 of each reinforcing film 4, the corresponding catalyst layer 3 is exposed except for the outer edge portion 31. Distance B from the outer edge of each catalyst layer 3 to the inner edge of each reinforcing film 4 (see FIG. 3) is preferably from about 1 to about 10 mm. Because the reinforcing films 4 are greater in size than the electrolyte membrane 2, outer edge portions 45 of the reinforcing films 4 are welded together outside the electrolyte membrane 2. Distance D from the outer edge of each reinforcing film 4 to the outer edge of the electrolyte membrane 2 (see FIG. 3) is preferably from about 1 to about 100 mm. The assembly wherein the reinforcing films 4 are welded to the membrane-catalyst layer assembly 10 is referred to as a membrane-catalyst layer assembly with reinforcing films.

Each gas diffusion layer 5 that is rectangular from a plan view is formed on the corresponding catalyst layer 3 exposed through the opening 41 in the reinforcing film 4. Distance A from the outer edge of the gas diffusion layer 5 to the inner edge of the reinforcing film 4 (see FIG. 3) is preferably from about 0 to about 5 mm. Each gas diffusion layer 5 and each catalyst layer 3 constitute an electrode E. The assembly wherein the electrodes E are formed on both surfaces of the electrolyte membrane 2 is referred to as a membrane electrode assembly 20. The membrane electrode assembly 20 with the reinforcing films 4 is referred to as a membrane electrode assembly with reinforcing films.

Each frame-shaped gasket 6 is mounted on each reinforcing film 4 to surround the corresponding electrode E. Each separator 7 is mounted on each electrode E and gasket 6. The separator 7 has gas flow paths 71 in regions opposed to the gas diffusion layer 5.

Materials for the components that form the polymer electrolyte fuel cell 1 having the above-described structure are next described.

The electrolyte membrane 2 is formed by, for example, applying a solution containing a proton-exchange polymer electrolyte to a substrate, and then drying the applied film. Examples of proton-exchange polymer electrolytes include perfluorosulfonic acid-based, fluorine ion-exchange resins; and more specifically, perfluorocarbon sulfonic acid-based polymers (PFS polymers) obtained by substituting the C—H bonds of hydrocarbon-based ion-exchange membranes with fluorine, and the like. The inclusion of the highly electronegative fluorine atom enables a very high chemical stability, a high degree of dissociation of the sulfonic group, and a high ionic conductivity. Specific examples of such proton-exchange polymer electrolytes include "Nafion" (registered trademark) by DuPont, "Flemion" (registered trademark) by Asahi Kasei Co., Ltd., "Aciplex" (registered trademark) by Asahi Kasei Co., Ltd., "Gore Select" (registered trademark) by Japan Gore Tex, Inc., and the like. The concentration of the proton-exchange polymer electrolyte in the solution containing the proton-exchange polymer electrolyte is preferably from about 5 to about 60% by weight, and more preferably from about 20 to about 40% by weight. Examples of other materials for the electrolyte membrane 2 include anion-exchange solid polymer electrolyte membranes and acid-doped polymer membranes. Examples of anion-exchange solid polymer electrolyte membranes include those using hydrocarbon- or fluorine-based resins. Specific examples of anion-exchange electrolyte membranes using hydrocarbon-based resins include Aciplex (registered trademark) A201, 211 and 221 by Asahi Kasei Corporation, Neosepta (registered trademark) AM-1 and AHA by Tokuyama Corporation, and the like. Specific examples of those using fluorine-based resins include Tosflex (registered trademark) IE-SF34 by Tosoh Corporation and the like. Examples of acid-doped polymer membranes include acid-doped polybenzimidazole membranes and the like.

The catalyst layers 3 on both the cathode and anode sides contain known catalyst particles. More specifically, the catalyst layers 3 contain carbon particles having catalyst particles supported thereon, and a proton-exchange polymer electrolyte. Examples of catalyst particles include those made of platinum, platinum compounds, and the like. Examples of platinum compounds include an alloy of platinum with at least one metal selected from ruthenium, palladium, nickel, molybdenum, iridium, iron, and the like. Typically, the catalyst particles contained in the catalyst layer on the cathode side are made of platinum, and the catalyst particles contained in the catalyst layer on the anode side are made of the above-mentioned alloy of a metal and platinum. The same materials as mentioned above for the electrolyte membrane 2 can also be used for the proton-exchange polymer electrolyte.

Examples of materials that can be preferably used as the material of the gas barrier layer 42 of each reinforcing film 4 include polyesters, polyamides, polyimides, polymethylpentene, polyphenylene oxide, polysulfone, polyether ether ketone, polyphenylene sulfide, and the like, which have barrier properties against steam, water, and fuel and oxidant gases. Specific examples of the polyesters include polyethylene terephthalate, polyethylene naphthalate, polybutylene terephthalate, polybutylene naphthalate, and the like.

A polyolefin resin is preferably used as the material of the first bonding layer 43 of each reinforcing film 4, and polyolefin resins that can be preferably used include medium-density polyethylene, high-density polyethylene, linear low-density polyethylene, ethylene-α-olefin copolymers, polypropylene, polybutene, polyisobutene, polyisobutylene, polybutadiene, polyisoprene, ethylene-methacrylic acid copolymers, ethylene-acrylic acid copolymers, ethylene-unsaturated carboxylic acid copolymers, ethylene-ethyl acrylate copolymers, ionomer resins, ethylene-vinyl acetate copolymers, and the like. Acid-modified polyolefin resins or silane-modified polyolefin resins obtained by modifying the above-mentioned polyolefin resins can also be used. Among these examples, polypropylenes grafted with unsaturated carboxylic acids, or polyethylenes modified with unsaturated carboxylic acids are preferably used to impart good insulating properties and heat resistance.

A general gas diffusion layer for a fuel electrode or an air electrode can be used as each of the gas diffusion layers 5. The gas diffusion layers 5 are made of a porous conductive substrate to efficiently supply the fuels, i.e., a fuel gas and an oxidant gas, to the catalyst layers 3. Examples of porous conductive substrates include carbon paper, carbon cloth, and the like.

Gaskets that retain sufficient strength to withstand heat pressing, and have gas barrier properties sufficient to prevent leakage of the fuel and oxidant gases to the outside, are usable as the gaskets 6. For example, polyethylene terephthalate sheets, Teflon (registered trademark) sheets, silicon rubber sheets, and the like can be mentioned.

Carbon plates with gas flow paths 71 can be typically used as the separators 7. In addition to these, usable separators include those obtained by coating metal surfaces such as stainless steels and the like with conductive materials such as chromium, platinum group metals, oxides of platinum group metals, conductive polymers and the like, and those obtained by plating metal surfaces such as stainless steels and the like with materials such as silver, composite oxides of platinum group metals, chromium nitride, and the like.

A method for manufacturing the above-described polymer electrolyte fuel cell 1 is next described with reference to the drawings.

Figure 4:
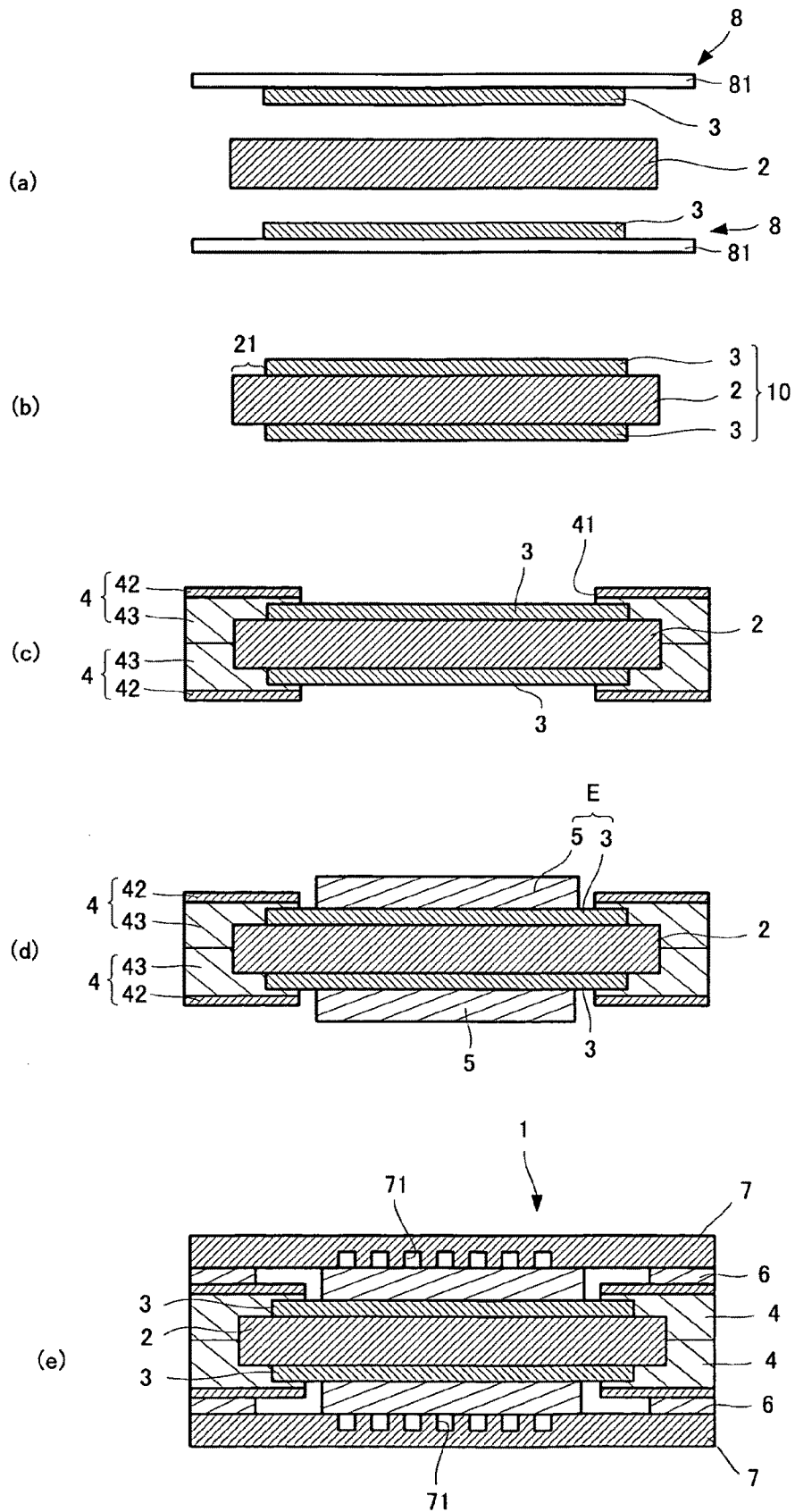
FIGS. 4 (*a*) to (*e*) are front cross-sectional views showing a method for manufacturing the polymer electrolyte fuel cell according to the first embodiment.

As shown in FIG. 4, an electrolyte membrane 2 made of the above-mentioned material is prepared, and transfer sheets 8 for forming catalyst layers are disposed on both surfaces of the electrolyte membrane 2. Each of the transfer sheets 8 for forming a catalyst layer has, on a transfer substrate 81, a catalyst layer 3 to be transferred. A method for manufacturing the transfer sheets 8 for forming catalyst layers is now explained. First, carbon particles having the above-mentioned catalyst particles supported thereon, and a proton-exchange polymer electrolyte, are mixed in a suitable solvent and dispersed to prepare a catalyst paste. The catalyst paste is then applied onto the transfer substrate 81 so that the catalyst layer 3 formed on the electrolyte membrane 2 has a desired thickness. As required, a release layer may be formed between the catalyst paste and transfer substrate 81. The catalyst paste is applied to the transfer substrate 81 so that the catalyst layer 3 has smaller dimensions than the electrolyte membrane 2. Alternatively, the catalyst paste may be applied to the entire surface of the transfer substrate 81, and then the substrate may be cut to dimensions smaller than those of the electrolyte membrane 2. Examples of methods for applying the catalyst paste include screen printing, spray coating, die coating, knife coating, and the like. Examples of the solvent include various alcohols, ethers, dialkylsulfoxides, water, and mixtures thereof, with alcohols being preferred. Examples of alcohols include monovalent alcohols with one to four carbon atoms, such as methanol, ethanol, n-propanol, isopropanol, n-butanol, tert-butanol, and the like; various multivalent alcohols; and the like.

Examples of the material of each transfer substrate 81 include polymer films such as polyimides, polyethylene terephthalate, parabanic acid aramid, polyamides (nylon), polysulfone, polyether sulfone, polyphenylene sulfide, polyether ether ketone, polyetherimide, polyarylate, polyethylene naphthalate, and the like. In addition, heat-resistant fluororesins can be used, such as ethylene tetrafluoroethylene copolymer (ETFE), tetrafluoroethylene-hexafluoropropylene copolymer (FEP), tetrafluoro-perfluoroalkyl vinyl ether copolymer (PFA), polytetrafluoroethylene (PTFE), and the like. In place of a polymer film, the transfer substrate 81 may also be made of coated paper such as art paper or the like, or non-coated paper such as note paper, copy paper, or the like. The transfer substrate 81 preferably has a thickness of from about 6 to about 100 am, and more preferably from about 10 to about 30 µm, in view of the ease of handling and economic efficiency. Thus, the transfer substrate 81 is preferably made of a polymer film, which is inexpensive and readily available, and is more preferably made of polyethylene terephthalate or the like.

After application of the catalyst paste, the applied paste is dried for a predetermined time at a predetermined temperature to form a catalyst layer 3 on the transfer substrate 81. The drying temperature is preferably from about 40 to about 100° C., and more preferably from about 60 to about 80° C. The drying time depends upon the drying temperature, but is preferably from about 5 minutes to about 2 hours, and more preferably from about 10 minutes to about 1 hour.

Referring back to FIG. 4, the explanation of the method for manufacturing the polymer electrode fuel cell is continued. Each of the transfer sheets 8 for forming a catalyst layer prepared as above is disposed so that the catalyst layer 3 faces the electrolyte membrane 2 (FIG. 4 (*a*)). The transfer sheets 8 are then heat-pressed from the rear surfaces thereof to transfer the catalyst layers 3 onto the upper and lower surfaces of the electrolyte membrane 2, after which the transfer substrate 81 of each transfer sheet 8 is removed to complete an electrolyte-catalyst layer assembly (FIG. 4 (*b*)). In view of the workability, the catalyst layers 3 are preferably transferred to both surfaces of the electrolyte membrane 2 simultaneously, but each catalyst layer 3 may also be transferred separately to one surface of the electrolyte membrane 2. The pressure applied during heat pressing is preferably from about 0.5 to about 20 MPa, and more preferably from about 1 to about 10 MPa, to avoid transfer defects. Moreover, the surface to which pressure is applied is preferably heated to avoid transfer defects. The heating temperature is preferably 200° C. or less, and more preferably 150° C. or less, to prevent the electrolyte membrane 2 from being broken, deformed, or the like.

Figure 5:
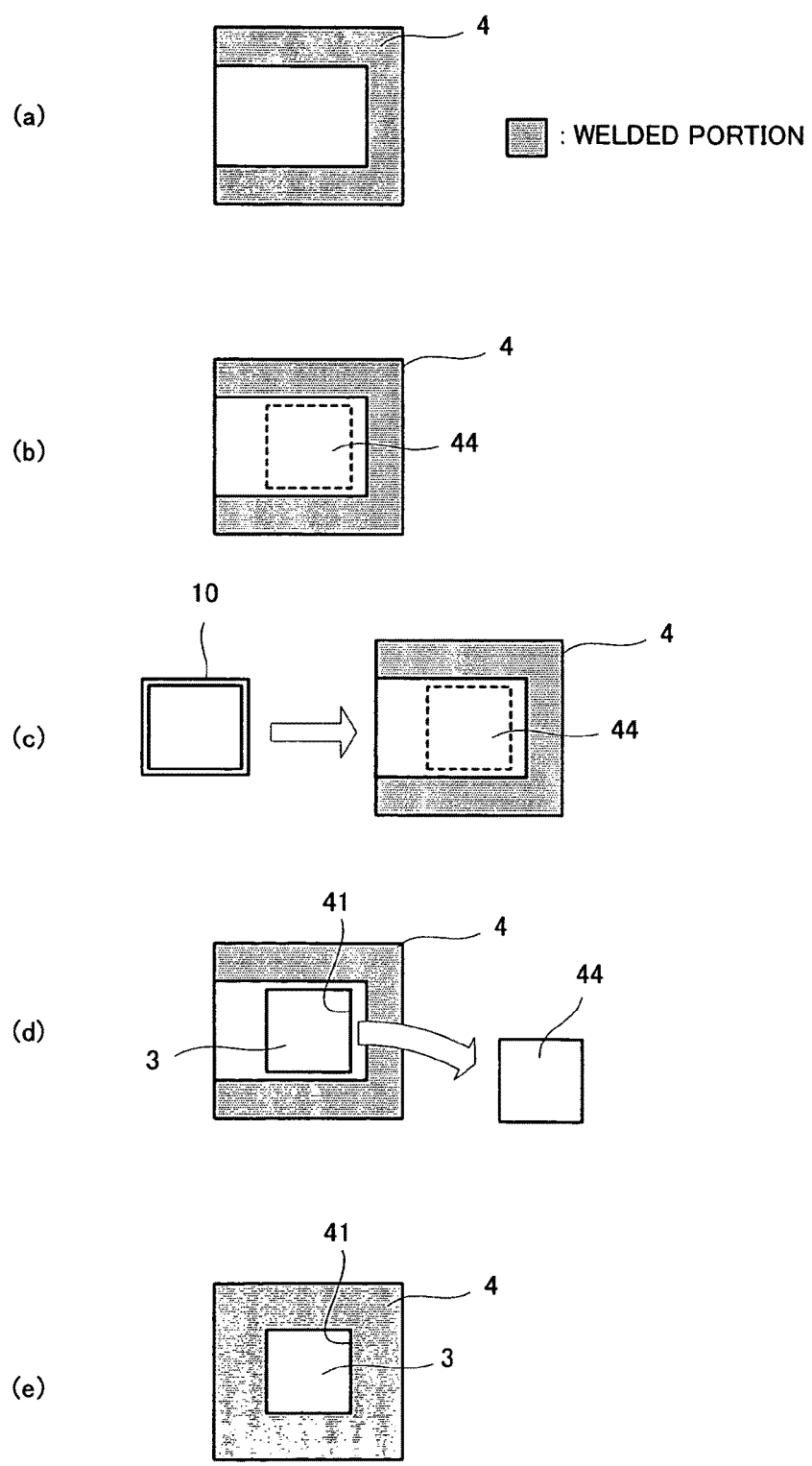
FIGS. 5 (*a*) to (*e*) are plan views showing how the reinforcing films are attached to the membrane-catalyst layer assembly.

Reinforcing films 4 are attached to the resulting membrane-catalyst layer assembly 10 (FIG. 4 (*c*)). This step is explained in detail with reference to FIG. 5. As shown in FIG. 5, two reinforcing films 4 made of the above-mentioned material are laminated so that the first bonding layers 43 face each other, and the films are welded together on three sides, with one side left unwelded. As a result, the two reinforcing films 4 are formed into a bag-like structure in which only one side is open (FIG. 5 (*a*)). Various known methods are usable as the welding method, and examples of usable methods include high frequency welding, hot gas welding, hot plate welding, impulse welding, rod welding, ultrasonic welding, and the like.

Each reinforcing film 4 forming the bag-like structure is provided with an easily removed region 44 in a central portion thereof. The easily removed region 44 is smaller in size than the catalyst layers 3 of the membrane-catalyst layer assembly 10 (FIG. 5 (*b*)). The term "easily removed region 44" refers to a region that is easy to remove, and can be formed by, for example, perforating the outer edges of the region, or cutting a slit along the region, with a portion thereof left uncut. The membrane-catalyst layer assembly 10 is then inserted into this bag-like structure provided with the easily removed region 44 from the unwelded left side, and moved to a predetermined position (FIG. 5 (*c*)). The term "predetermined position" refers to a position where each catalyst layer 3 of the membrane-catalyst layer assembly 10, except for the outer edge portion 31, is opposed to the easily removed region 44.

After the membrane-catalyst layer assembly 10 has been moved to the predetermined position, the perforation along the outer edges of each easily removed region 44 is detached and removed from the reinforcing film 4, to form an opening 41 in the central portion of each reinforcing film 4 (FIG. 5 (*d*)). Upon formation of the opening 41, each of the catalyst layers 3 of the membrane-catalyst layer assembly 10, except for the outer edge portion 31, is exposed through the opening 41. The remaining unwelded portion of the first bonding layer 43 of each reinforcing film 4 is subsequently welded by the above-mentioned known method, so that each first bonding layer 43 is welded to the outer edge portion 31 of the catalyst layer 3 and the outer edge portion 21 of the electrolyte membrane 2, and both of the first bonding layers 43 are welded together. Through the above-described steps, a membrane-catalyst layer assembly with reinforcing films is accomplished (FIG. 5 (*e*) and FIG. 4 (*c*)).

Referring back to FIG. 4, the explanation of the method for manufacturing the polymer electrolyte fuel cell 1 is continued. On each of the catalyst layers 3 exposed through the opening 41 in the membrane-catalyst layer assembly with reinforcing films, a gas diffusion layer 5 is formed by thermocompression bonding to complete a membrane electrode assembly with reinforcing films (FIG. 4 (*d*)). A gasket 6 is then disposed on each reinforcing film 4 to surround each electrode E formed of the catalyst layer 3 and gas diffusion layer 5. Lastly, a separator 7 is disposed on each gas diffusion layer 5 and each gasket 6 so that the gas flow paths 71 are opposed to the gas diffusion layer 5, and then the separators 7 sandwich the membrane electrode assembly 20 so as to establish an electrical connection between each gas diffusion layer 5 and the corresponding separator 7, thereby accomplishing a polymer electrolyte fuel cell 1 (FIG. 4 (*e*)).

As explained above, in the first embodiment, the outer edge portions 21 of the electrolyte membrane 2 are confined by welding of the reinforcing films 4. This prevents expansion and shrinkage of the outer edge portions 21 of the electrolyte membrane 2 to prevent breakage of the outer edge portions 21 of the electrolyte membrane 2. Moreover, although each of the reinforcing films 4 is welded on the outer edge portion 21 of the electrolyte membrane 2 and the outer edge portion 31 of the catalyst layer 3, it is not located on the gas diffusion layer 5. Therefore, each of the gas diffusion layers 5 forms a flat upper surface, and the separator 7 mounted on the gas diffusion layer 5 is in uniform contact with the gas diffusion layer 5. This eliminates problems such as lowered current collection efficiency of the separator 7. Furthermore, the formation of each reinforcing film 4 with the first bonding layer 43 and gas barrier layer 42 prevents, for example, leakage of a fuel gas supplied to the anode-side electrode into the cathode-side electrode E via the reinforcing film 4, or leakage of an oxidant gas in the opposite direction.

Second Embodiment

A second embodiment is described below with reference to the drawings, with emphasis on features of the second embodiment different from those of the first embodiment.

Figure 6:
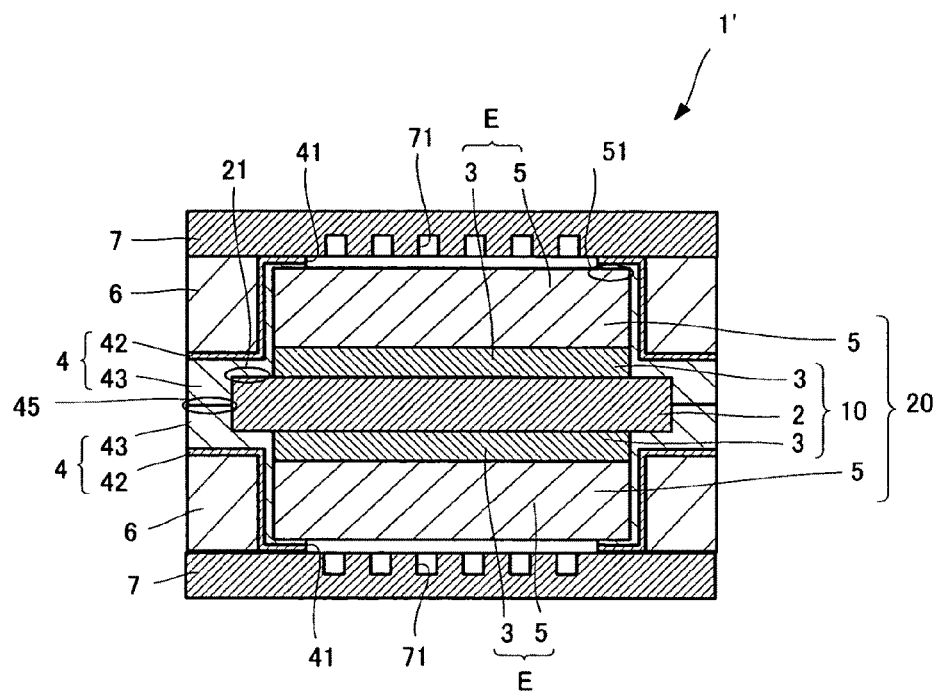
FIG. 6 is a front cross-sectional view of a polymer electrolyte fuel cell according to a second embodiment.
Figure 7:
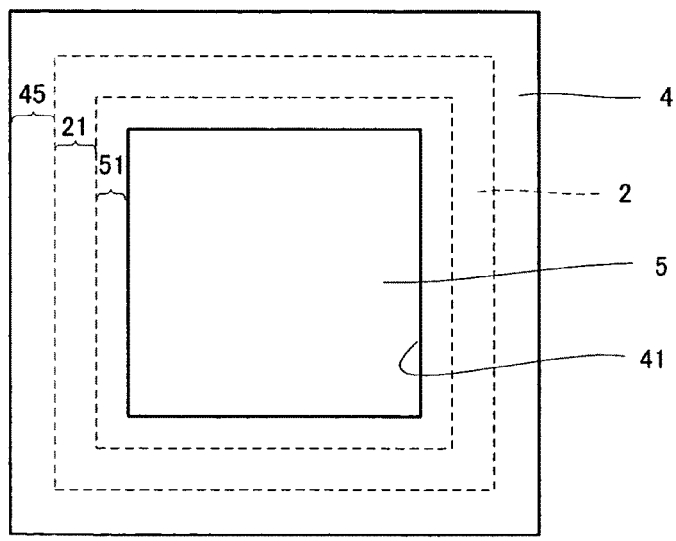
FIG. 7 is a plan view of a membrane electrode assembly with reinforcing films according to the second embodiment.
Figure 8:
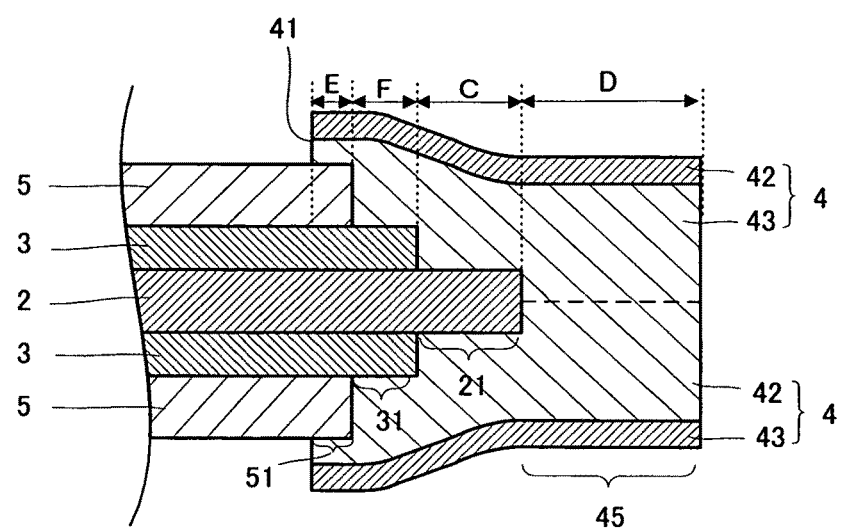
FIG. 8 is an enlarged front cross-sectional view showing in detail a portion of the outer edge of the membrane electrode assembly with reinforcing films according to the second embodiment.

As shown in FIGS. 6 and 7, the polymer electrolyte fuel cell 1' includes a membrane-catalyst layer assembly 10, which is identical to that of the first embodiment. On each of catalyst layers 3 of the membrane-catalyst layer assembly 10 lies a gas diffusion layer 5 that is rectangular from a plan view. Each catalyst layer 3 and each gas diffusion layer 5 constitute an electrode E. The gas diffusion layer 5 is substantially identical in size to the catalyst layer 3, or is smaller than the catalyst layer 3. Distance F from the outer edge of the gas diffusion layer 5 to the outer edge of the catalyst layer 3 (see FIG. 8) is preferably from about 0 to about 5 mm. The assembly wherein the gas diffusion layers 5 are formed on both catalyst layers 3 of the membrane-catalyst layer assembly 10 is referred to as a membrane electrode assembly 20.

Reinforcing films 4 with a central opening 41 are welded to upper and lower surfaces of the membrane electrode assembly 20. The reinforcing films 4 are identical to the reinforcing films 4 of the first embodiment, and each reinforcing film 4 has a gas barrier layer 42 and a first bonding layer 43. With the reinforcing films 4 welded to the membrane electrode assembly 20, each of the first bonding layers 43 is welded to an outer edge portion 51 of each gas diffusion layer 5 and an outer edge portion 21 of the electrolyte 2, such that the gas diffusion layer 5, except for the outer edge portion 51, is exposed through the opening 41 of each reinforcing film 4. When the gas diffusion layer 5 is smaller than the catalyst layer 3, the first bonding layer 43 is also welded to an outer edge portion 31 of the catalyst layer 3. Distance E from the outer edge of the gas diffusion layer 5 to the inner edge of the reinforcing film 4 (see FIG. 8) is preferably from about 1 to about 10 mm. Because the reinforcing films 4 are greater in size than the electrolyte membrane 2, outer edge portions 45 of the reinforcing films 4 are welded together outside the electrolyte membrane 2. As in the first embodiment, distance D from the outer edge of the reinforcing film 4 to the outer edge of the electrolyte membrane 2 (see FIG. 8) is preferably from about 1 to about 100 mm.

As in the first embodiment, gaskets 6 and separators 7 are provided.

Materials for the components forming the polymer electrolyte fuel cell 1' are not described here because they have already been described in the first embodiment.

A method for manufacturing the above-described polymer electrolyte fuel cell 1' is next described with reference to the drawings.

Figure 9:
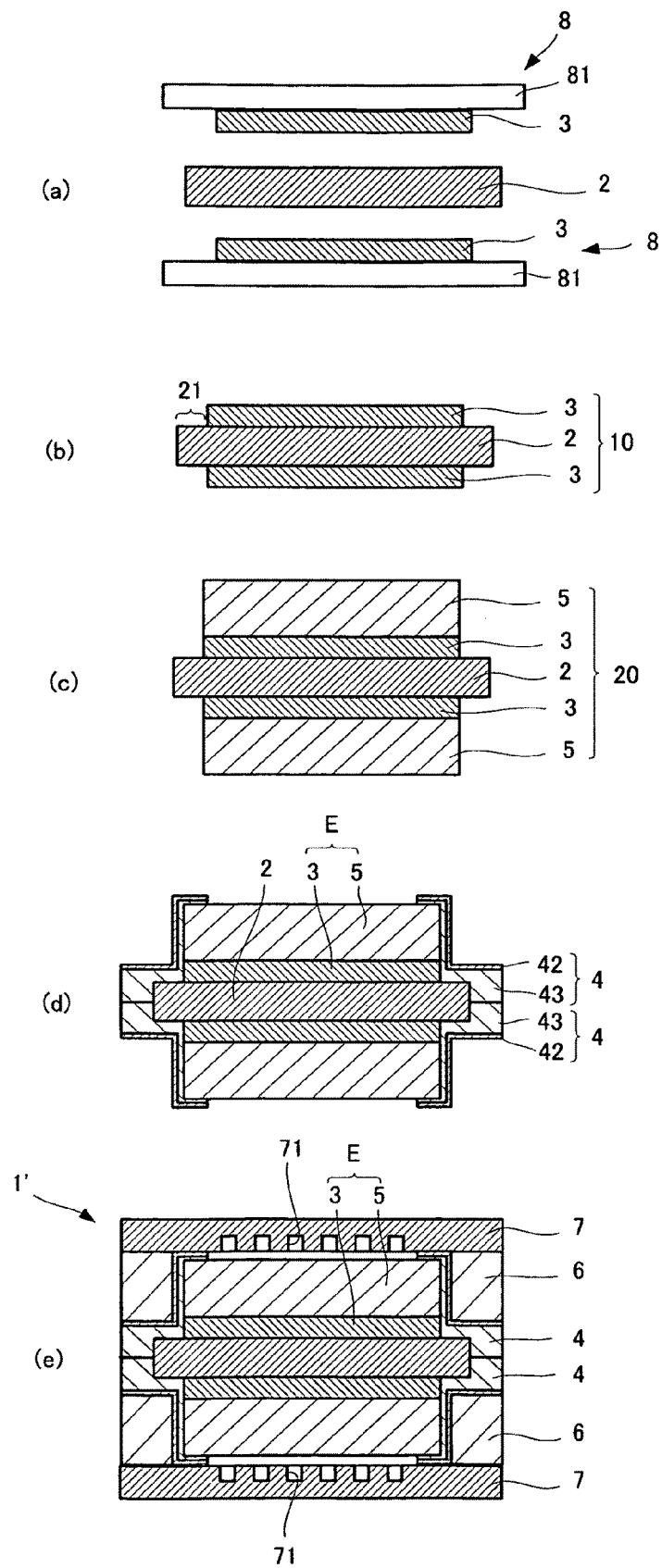
FIGS. 9 (*a*) to (*e*) are front cross-sectional views showing a method for manufacturing the polymer electrolyte fuel cell according to the second embodiment.

As shown in FIG. 9, a membrane-catalyst layer assembly 10 is first prepared (FIG. 9 (b)). Since the method for preparing the membrane-catalyst layer assembly 10 is the same as that of the first embodiment, the description thereof is omitted.

Gas diffusion layers 5 are formed on both catalyst layers 3 of the membrane-catalyst layer assembly 10 by thermocompression bonding to complete a membrane electrode assembly 20 (FIG. 9 (c)).

Reinforcing films 4 are then attached to both surfaces of the membrane electrode assembly 20 (FIG. 9 (d)). Since the method for attaching the reinforcing films 4 is the same as that of the first embodiment, it is not described here. In the first embodiment, the membrane-catalyst layer assembly 10 is inserted into the bag-like structure of the reinforcing films 4; however, the second embodiment is different from the first embodiment in that the membrane electrode assembly 20 is inserted into the bag-like structure of the reinforcing films 4. Thus, in the second embodiment, each of the gas diffusion layers 5, except for the outer edge portion 51, of the membrane electrode assembly 20 is exposed through the opening 41. Each of the reinforcing films 4 is welded to the outer edge portion 51 of the gas diffusion layer 5 and the outer edge portion 21 of the electrolyte membrane 2 of the electrolyte-electrode assembly 20. Through the above-described steps, a membrane electrode assembly with reinforcing films is accomplished (FIG. 9 (d)).

Lastly, as in the first embodiment, gaskets 6 and separators 7 are provided to complete a polymer electrolyte fuel cell 1' (FIG. 9 (e)). Although FIGS. 6 and 9 illustrate each gas diffusion layer 5 and separator 7 as not being in contact with each other, since the reinforcing films 4 are actually very thin, the gas diffusion layer 5 and separator 7 are in such close contact with each other that current collection is attainable.

As described above, in the second embodiment, each reinforcing film 4 is located on the outer edge portion 21 of the electrolyte membrane 2, on which the catalyst layer 3 is not formed. Therefore, the portion of the electrolyte membrane 2 corresponding to the gap portion between each catalyst layer 3 and gasket 6 is confined by each reinforcing film 4. This prevents the electrolyte membrane 2 from experiencing expansion and shrinkage due to repeated moist and dry states, thus preventing breakage of the electrolyte membrane 2. Moreover, the gas barrier layer 42 of each reinforcing film 4 can prevent a fuel gas supplied to the anode-side electrode E from flowing into the cathode-side electrode E via the reinforcing film 4, or can prevent an oxidant gas supplied to the cathode-side electrode E from flowing into the anode-side electrode E via the reinforcing film 4.

While the first and second embodiments have been described above, the present invention is by no means limited by these embodiments, and various modifications can be made without departing from the scope of the invention. For example, in the foregoing embodiments, the first bonding layer 43 of each reinforcing film 4 is welded to the membrane-catalyst layer assembly 10 or the membrane electrode assembly 20; however, the first bonding layer 43 may also be adhesive-bonded to the membrane-catalyst layer assembly 10 or the membrane electrode assembly 20. In this case, examples of usable materials for the first bonding layer 43 include acrylic, rubber, and silicone adhesives. More specifically, acrylate copolymers, methacrylate copolymers, natural rubber (NR), synthetic natural rubber (IR), styrene-butadiene rubber (SBR), polyisobutylene (PIB), isobutylene-isoprene rubber (IIR), silicone rubber, and the like can be mentioned. When the first bonding layer 43 is adhesive, the reinforcing films 4 are attached to the membrane-catalyst layer assembly 10 as follows. First, the reinforcing films 4 are each disposed on upper and lower surfaces of the membrane-catalyst layer assembly 10. At that time, the reinforcing films 4 are disposed so that the first bonding layers 43 of the reinforcing films 4 are opposed to each other. Each reinforcing film 4 is then adhesive-bonded onto the outer edge portion 31 of the catalyst layer 3 and the outer edge portion 21 of the electrolyte membrane 2 so that each catalyst layer 3, except for the outer edge portion 31, is exposed through the opening 41 of the reinforcing film 4. Various methods can be used to adhesive-bond the reinforcing films 4 to the outer edge portions 31 of the catalyst layers 3 and the like; for example, adhesive bonding can be accomplished by rolling a hand roller on each reinforcing film 4, or by applying pressure using a press. The pressure applied to accomplish adhesive bonding may be considerably lower than the pressure applied during thermocompression bonding. For example, a pressure of from about 0.1 to about 0.3 MPa is sufficient to adhesive-bond the reinforcing films 4 to the outer edge portions 31 of the catalyst layers 3 and the like. Using the same method, the reinforcing films 4 can also be attached to the membrane electrode assembly 20.

Figure 10:
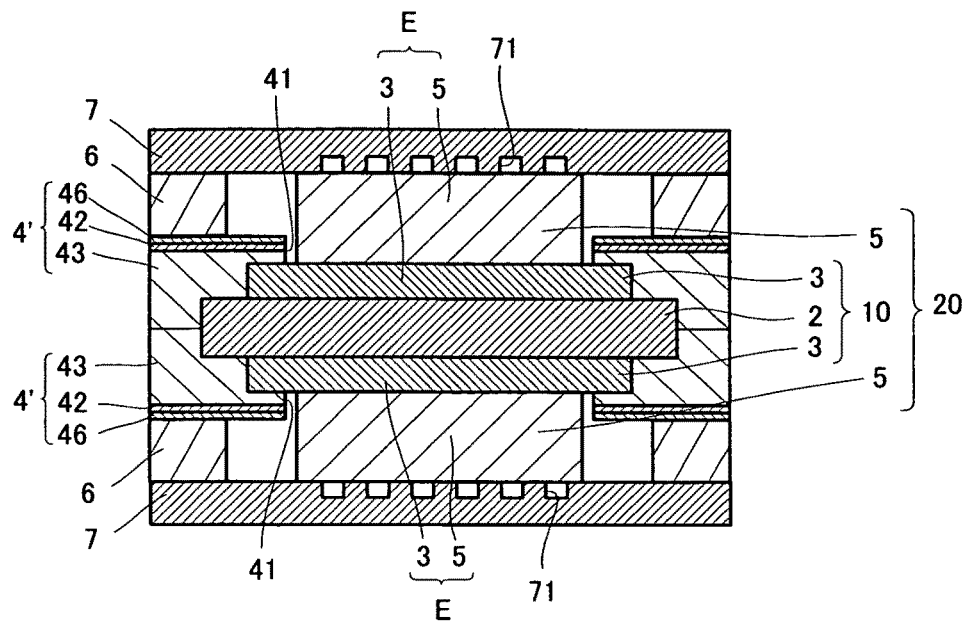
FIG. 10 is a front cross-sectional view showing a modified example of the polymer electrolyte fuel cell according to the first embodiment.
Figure 11:
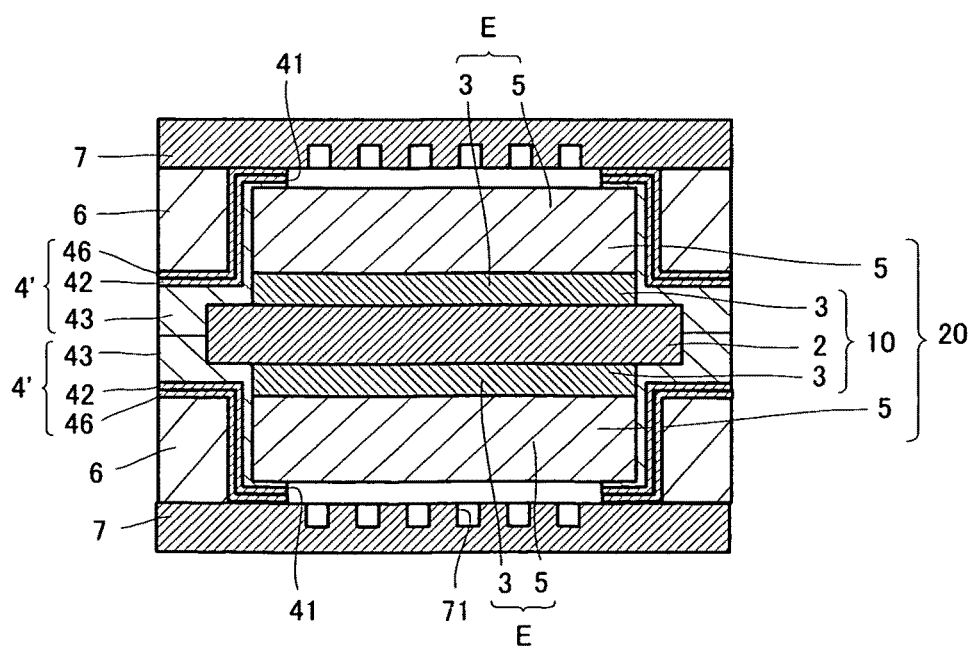
FIG. 11 is a front cross-sectional view showing a modified example of the polymer electrolyte fuel cell according to the second embodiment.

In each of the foregoing embodiments, each reinforcing film 4 consists of two layers, but may also consist of three layers. In this case, as shown in FIGS. 10 and 11, a reinforcing film 4' preferably includes, in sequence from the electrolyte membrane 2 side, a first bonding layer 43, a gas barrier layer 42, and a second bonding layer 46. The second bonding layer 46 is welded to a gasket 6. Preferably, the first bonding layer 43 has a thickness of from about 1 to about 50 μm, the gas barrier layer 42 has a thickness of from about 6 to about 20 μm, and the second bonding layer 46 has a thickness of from about 1 to about 50 μm. The same materials as described in the first embodiment for the first bonding layer are also used for the second bonding layer 46. The second bonding layer 46 preferably has a melting point higher than that of the first bonding layer 43. The melting point of the second bonding layer 46 is preferably about 30 to about 60° C. higher than that of the first bonding layer. Because the first bonding layer 43 and the second bonding layer 46 have different melting points, when the reinforcing film 4' is welded to the membrane-catalyst layer assembly 10 or membrane electrode assembly 20, welding is first performed at a temperature that is higher than the melting point of the first bonding layer 43, but lower than the melting point of the second bonding layer 46. This enables only the first bonding layer 43 to be melted, thereby welding the reinforcing film 4' to the membrane-catalyst layer assembly 10 or membrane electrode assembly 20. Welding is then performed at a temperature higher than the melting point of the second bonding layer 46, thereby melting the second bonding layer 46 and welding the reinforcing film 4' to the gasket 6. This welding method can reduce the heat applied to the membrane-catalyst layer assembly 10 or membrane electrode assembly 20, thereby reducing damage by heat.

Figure 12:
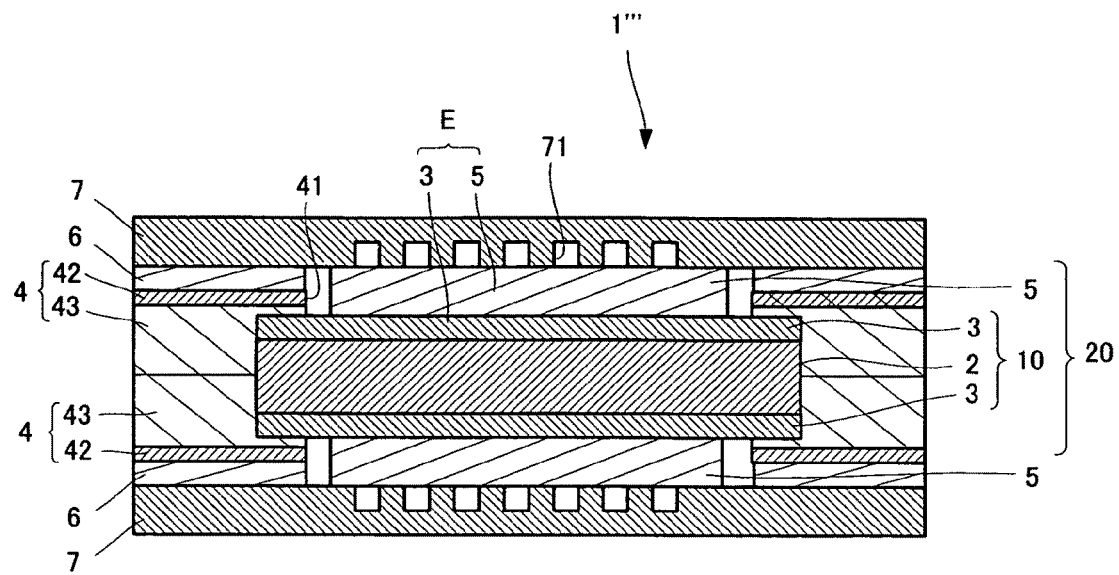
FIG. 12 is a front cross-sectional view showing another modified example of the polymer electrolyte fuel cell according to the first embodiment.
Figure 13:
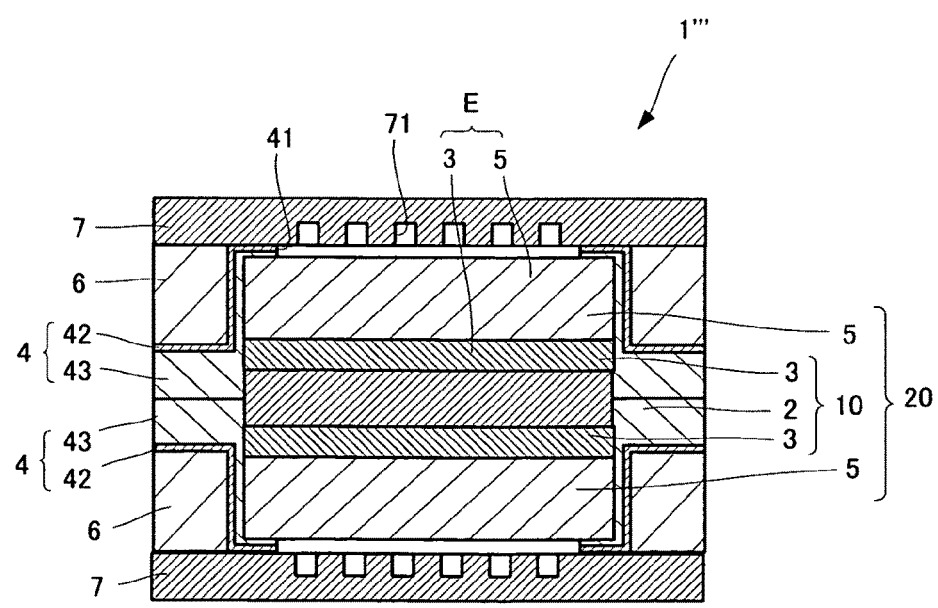
FIG. 13 is a front cross-sectional view showing another modified example of the polymer electrolyte fuel cell according to the second embodiment.

In each of the foregoing embodiments, each catalyst layer 3 is smaller than the electrolyte membrane 2; however, as shown in FIGS. 12 and 13, each catalyst layer may have the same size as that of the electrolyte membrane 2. Making the electrolyte membrane 2 and the catalyst layers 3 identical in size can prevent the electrolyte membrane 2 from having a portion that does not contribute to the generation of power.

In each of the foregoing embodiments, the reinforcing films 4 are formed into a bag-like structure, and then attached to the membrane-catalyst layer assembly 10 or membrane electrode assembly 20; however, the reinforcing films 4 may also be attached to the membrane-catalyst layer assembly 10 or membrane electrode assembly 20 by other methods. For example, the reinforcing films 4 with a preformed opening 41 may be disposed on both surfaces of the membrane-catalyst layer assembly 10 or membrane electrode assembly 20 so that each first bonding layer 43 faces the membrane-catalyst layer assembly 10 or membrane electrode assembly 20, and then the reinforcing films 4 may be welded to both surfaces of the membrane-catalyst layer assembly 10 or membrane electrode assembly 20 by, for example, the above-described welding methods.

In the foregoing embodiments, the electrolyte membrane 2, catalyst layers 3, and gas diffusion layers 5 were all described as having a rectangular shape from a plan view; however, they may also have any other suitable shape such as, for example, a circular shape from a plan view.

To improve the bonding between each gas barrier layer 42 and each first bonding layer 43, an isocyanate-, polyethylene-imin-, polyurethane-, polybutadiene-, or a like material-based bonding promoter layer may further be formed between the gas barrier layer 42 and the bonding layer 53.

The invention is described in greater detail below with reference to Examples and Comparative Examples; however, the invention is not limited by the following Examples.

Example 1

A polymer electrolyte fuel cell as shown in FIG. 1 was prepared as follows.

A 53 μm thick NRE212CS (manufactured by Dupont) cut to a size of 63×63 mm was used as an electrolyte membrane 2.

Transfer sheets 8 for forming catalyst layers were then prepared as follows. First, 10 g of 1-butanol, 10 g of 3-butanol, 20 g of a fluororesin (a 5 wt % Nafion binder, manufactured by Dupont), and 6 g of water were added to 2 g of carbon with a platinum catalyst supported thereon (platinum content: 45.7 wt %; Tanaka Kikinzoku Group, TEC10E50E). These components were mixed using a dispersion machine to prepare an ink composition for forming catalyst layers. The ink composition for forming catalyst layers was then applied to polyester films (manufactured by Toray, X44, film thickness: 25 μm) so that the catalyst layers after drying had a platinum weight of 0.4 mg/cm$^2$, thereby preparing transfer sheets 8 for forming catalyst layers.

The thus prepared transfer sheets 8 for forming catalyst layers were cut to a size of 60×60 mm, and centrally aligned on both surfaces of the electrolyte membrane 2 so that the catalyst layers 3 faced the electrolyte membrane 2. The transfer sheets 8 were then heat-pressed for 150 seconds at 135° C. and 5.0 MPa, to transfer the catalyst layers 3 on both-surfaces of the electrolyte membrane 2, thereby preparing a membrane-catalyst layer assembly 10. The thickness of the catalyst layers was 20 μm.

Reinforcing films 4 were prepared next. Biaxially oriented polyethylene naphthalate (manufactured by Teijin, Ltd., Teonex, film thickness: 12 μm) was used as the gas barrier layers 42 of the reinforcing films 4. A polypropylene grafted with an unsaturated carboxylic acid was extruded on the gas barrier layers 42 to a thickness of 30 μm by the melt extrusion method, thereby forming a first bonding layer 43. Each of the reinforcing films 4 was cut to a size of 80×80 mm, and provided with a 50×50 mm opening 41 in a central portion thereof. The reinforcing films 4 were then centrally aligned on both surfaces of the membrane-catalyst layer assembly 10, and heat-pressed for 30 seconds at 130° C. and 1.0 MPa to be welded to the membrane-catalyst layer assembly 10, thereby preparing a membrane-catalyst layer assembly with reinforcing films.

Pieces of carbon paper (manufactured by Toray, TGP-H-090, thickness: 280 μm) cut to a size of 49×49 mm were then laminated, as gas diffusion layers 5, onto the catalyst layers 3 exposed through the openings 41, thereby forming a membrane electrode assembly with reinforcing films. Ethylene-propylene rubber gaskets 6 (manufactured by NOK Corp., EPDM, thickness: 250 µm) were located on the gas barrier layers 42, and then carbon separators 7 were located to sandwich the membrane electrode assembly with reinforcing films provided with the gaskets 6, thereby yielding a polymer electrolyte fuel cell.

Example 2

A polymer electrolyte fuel cell according to Example 2 was prepared in the same manner as the polymer electrolyte fuel cell according to Example 1, except that the materials of the reinforcing films 4 were changed, the heat-pressing conditions during transfer of the catalyst layers 3 onto the electrolyte membrane 2 were changed, and the heat-pressing conditions during welding of the reinforcing films 4 to the membrane-catalyst layer assembly 10 were changed.

The materials of the reinforcing films 4 were as follows. Biaxially oriented polyethylene terephthalate (manufactured by Teijin, Ltd., Teflex, film thickness: 20 am) was used as the gas barrier layers 42. A polyethylene grafted with an unsaturated carboxylic acid was extruded on the gas barrier layers 42 to a thickness of 30 µm by the melt extrusion method, thereby forming a first bonding layer 43. Heat pressing during transfer of the catalyst layers 3 onto the electrolyte membrane 2 was performed for 120 seconds at 130° C. and 3.0 MPa. Heat pressing during welding of the reinforcing films 4 to the membrane-catalyst layer assembly 10 was performed for 10 seconds at 110° C. and 1.0 MPa.

Example 3

A polymer electrolyte fuel cell according to Example 3 was prepared in the same manner as the polymer electrolyte fuel cell according to Example 1 above, except that the heat-pressing conditions during transfer of the catalyst layers 3 onto the electrolyte membrane 2 were changed, and the heat-pressing conditions during welding of the reinforcing films 4 to the membrane-catalyst layer assembly 10 were changed. Heat pressing during transfer of the catalyst layers 3 onto the electrolyte membrane 2 was performed for 120 seconds at 130° C. and 3.0 MPa. Heat pressing during transfer of the reinforcing films 4 onto the membrane-catalyst layer assembly 10 was performed for 10 seconds at 120° C. and 1.0 MPa.

Example 4

A polymer electrolyte fuel cell according to Example 4 was prepared in the same manner as the polymer electrolyte fuel cell according to Example 1 above, except that the transfer sheets 8 for forming catalyst layers were cut to a size of 54×54 mm.

Example 5

A polymer electrolyte fuel cell as shown in FIG. 6 was prepared as follows as a polymer electrolyte fuel cell according to Example 5.

Electrodes E each formed of a catalyst layer 3 and a gas diffusion layer 5 were prepared as follows. The same carbon paper as that of Example 1 was used as the gas diffusion layers 5. The same ink composition for forming catalyst layers as that of Example 1 was applied to each gas diffusion layer 5 so that the catalyst layers after drying had a platinum weight of 0.4 mg/cm$^2$, thereby forming electrodes E. The electrodes E were cut to a size of 60×60 mm.

The same electrolyte membrane 2 as that of Example 1 was then prepared, and the electrodes E were centrally aligned on both surfaces of the electrolyte membrane 2 so that the catalyst layers 3 faced the electrolyte membrane 2. The electrodes E were then formed on both surfaces of the electrolyte membrane 2 by heat-pressing for 150 seconds at 135° C. and 5.0 MPa, thereby preparing a membrane electrode assembly 20. The thickness of each electrode E was 300 µm. Thus, the membrane electrode assembly had a structure including the gas diffusion layer 5, catalyst layer 3, electrolyte membrane 2, catalyst layer 3, and gas diffusion layer 5.

Reinforcing films 4 were prepared next in the same manner as Example 1. The reinforcing films 4 were centrally aligned on both surfaces of the membrane electrode assembly 20, and then heat-pressed for 30 seconds at 130° C. and 1.0 MPa to be welded onto the membrane electrode assembly 20, thereby preparing a membrane electrode assembly with reinforcing films. Ethylene-propylene rubber gaskets 6 (manufactured by NOK Corp., EPDM, thickness: 250 µm) were located on the gas barrier layers 42, and then carbon separators 7 were located to sandwich the membrane electrode assembly with reinforcing films provided with the gaskets 6, thereby yielding a polymer electrolyte fuel cell.

Example 6

A polymer electrolyte fuel cell as shown in FIG. 6 was prepared as follows as a polymer electrolyte fuel cell according to Example 6.

A membrane-catalyst layer assembly 10 was prepared in the same manner as Example 1.

Gas diffusion layers 5 that differ from those of Example 1 only in size were prepared next, and each of the gas diffusion layers 5 was laminated on each catalyst layer 3 of the membrane-catalyst layer assembly 10. This resulted in a membrane electrode assembly 20 with a structure including the gas diffusion layer 5, catalyst layer 3, electrolyte membrane 2, catalyst layer 3, and gas diffusion layer 5. Each gas diffusion layer 5 was cut to a size of 60×60 mm.

Reinforcing films 4 were then prepared as in Example 1. The reinforcing films 4 were then centrally aligned on both surfaces of the membrane electrode assembly 20, and then heat-pressed for 30 seconds at 130° C. and 1.0 MPa to be welded onto the membrane electrode assembly 20, thereby preparing a membrane electrode assembly with reinforcing films. Ethylene-propylene rubber gaskets 6 (manufactured by NOK Corp., EPDM, thickness: 250 µm) were then located on the gas barrier layers 42, and then carbon separators 7 were located to sandwich the membrane electrode assembly with reinforcing films provided with the gaskets 6, thereby yielding a polymer electrolyte fuel cell.

Example 7

A polymer electrolyte fuel cell according to Example 7 was prepared in the same manner as the polymer electrolyte fuel cell according to Example 5 above, except that the materials of the reinforcing films 4 were changed, and the heat-pressing conditions during welding of the reinforcing films 4 to the membrane electrode assembly 20 were changed.

The same reinforcing films 4 as those of Example 2 were used in Example 7. The reinforcing films 4 were centrally aligned on both surfaces of the membrane electrode assembly 20, and then heat-pressed for 30 seconds at 100° C. and 1.0 MPa to be welded onto the membrane electrode assembly 20.

Example 8

A polymer electrolyte fuel cell according to Example 8 was prepared in the same manner as the polymer electrolyte fuel cell according to Example 6 above, except that the materials of the reinforcing films 4 were changed, and the heat-pressing conditions during welding of the reinforcing films 4 to the membrane electrode assembly 20 were changed.

The same reinforcing films 4 as those of Example 2 were used in Example 8. The reinforcing films 4 were centrally aligned on both surfaces of the membrane electrode assembly 20, and then heat-pressed for 30 seconds at 100° C. and 1.0 MPa to be welded onto the membrane electrode assembly 20.

Example 9

A polymer electrolyte fuel cell according to Example 9 was prepared in the same manner as Example 5 above, except that a polyimide (manufactured by Du Pont-Toray, Co., Ltd., Kapton (registered trademark), film thickness: 13 μm) was used as the gas barrier layers 42 of reinforcing films 4.

Example 10

A polymer electrolyte fuel cell according to Example 10 was prepared in the same manner as Example 6 above, except that a polyimide (manufactured by Du Pont-Toray, Co., Ltd., Kapton, film thickness: 13 μm) was used as the gas barrier layers 42 of reinforcing films 4.

Example 11

A polymer electrolyte fuel cell as shown in FIG. 1 was prepared as follows.

A membrane-catalyst layer assembly 10 was prepared as in Example 1.

Pross-Well (manufactured by Nitto Denko Corporation, PW-3610A) was used as the reinforcing films 4. The Pross-Well was composed of a gas barrier layer 42 made of a 25 μm thick polyimide and an bonding layer 43' made of a 10 μm thick acrylic resin. Each of the reinforcing films 4 was cut to a size of 80×80 mm, and provided with a 50×50 mm opening 41 in a central portion thereof. The reinforcing films 4 were then centrally located on both surfaces of the membrane-catalyst layer assembly 10, and bonded thereto by applying a pressure of 0.3 MPa, thereby preparing a membrane-catalyst layer assembly with reinforcing films.

A gas diffusion layer 5 identical to that of Example 1 was then laminated on each of the catalyst layers 3 exposed through the opening 41, thereby forming a membrane electrode assembly with reinforcing films. Gaskets 6 (manufactured by NOK Corp., EPDM, thickness: 250 μm) were then located on the gas barrier layers 42, and then carbon separators 7 were located to sandwich the membrane electrode assembly with reinforcing films provided with the gaskets 6, thereby yielding a polymer electrolyte fuel cell.

Example 12

A polymer electrolyte fuel cell as shown in FIG. 10 was prepared as follows as a polymer electrolyte fuel cell according to Example 12.

A membrane-catalyst layer assembly 10 was prepared in the same manner as Example 1, except that the size of the electrolyte membrane 2 was changed. The size of the electrolyte membrane 2 was 75×75 mm.

Reinforcing films 4 were prepared next. Biaxially oriented polyethylene naphthalate (manufactured by Teijin, Ltd., Teonex (registered trademark), film thickness: 12 μm) was used as the gas barrier layers 42 of the reinforcing films 4. A polpropylene grafted with an unsaturated carboxylic acid was extruded on one surface of the polyethylene naphthalate to a thickness of 15 μm by the melt extrusion method, thereby forming a second bonding layer 46. A polyethylene grafted with an unsaturated carboxylic acid was also extruded on the other surface of the polyethylene naphthalate to a thickness of 15 μm by the melt extrusion method, thereby forming a first bonding layer 43. Each of the reinforcing films 4 was cut to a size of 110×110 mm, and provided with a 50×50 mm opening 41 in a central portion thereof. The reinforcing films 4 were centrally aligned on both surfaces of the membrane-catalyst layer assembly 10 so that the first bonding layers 43 faced the membrane-catalyst layer assembly 10. The first bonding layers 43 of the reinforcing films 4 were then welded to the membrane-catalyst layer assembly 10 by heat-pressing for 30 seconds at 100° C. and 1.0 MPa, thereby preparing a membrane-catalyst layer assembly with reinforcing films. Then, ethylene-propylene rubber gaskets 6 (manufactured by NOK Corp., EPDM, thickness: 200 μm) were located on the second bonding layers 46, and subsequently heat-pressed for 30 seconds at 130° C. and 1.0 MPa to be fixed onto the second bonding layers 46. A gas diffusion layer 5 (manufactured by Toray, TGP-H-090, thickness: 280 μm) with a size of 50×50 mm was located in the opening 41 of each reinforcing film 4. Note that the first bonding layer 43 had a melting point of 110° C., and the second bonding layer 46 had a melting point of 146° C. The melting point of each bonding layer was measured according to JIS K7121, using a differential scanning calorimeter. Carbon separators 7 were located to sandwich the resulting membrane electrode assembly with reinforcing films provided with the gaskets 6.

Example 13

A polymer electrolyte fuel cell as shown in FIG. 12 was prepared as follows. The polymer electrolyte fuel cell according to Example 13 was prepared in the same manner as Example 1, except that the sizes of the electrolyte membrane 2 and transfer sheets 8 for forming catalyst layers were changed. The electrolyte membrane 2 was cut to a size of 53×53 mm, and each transfer sheet 8 for forming a catalyst layer was cut to a size of 53×53 mm.

Example 14

Figure 14:
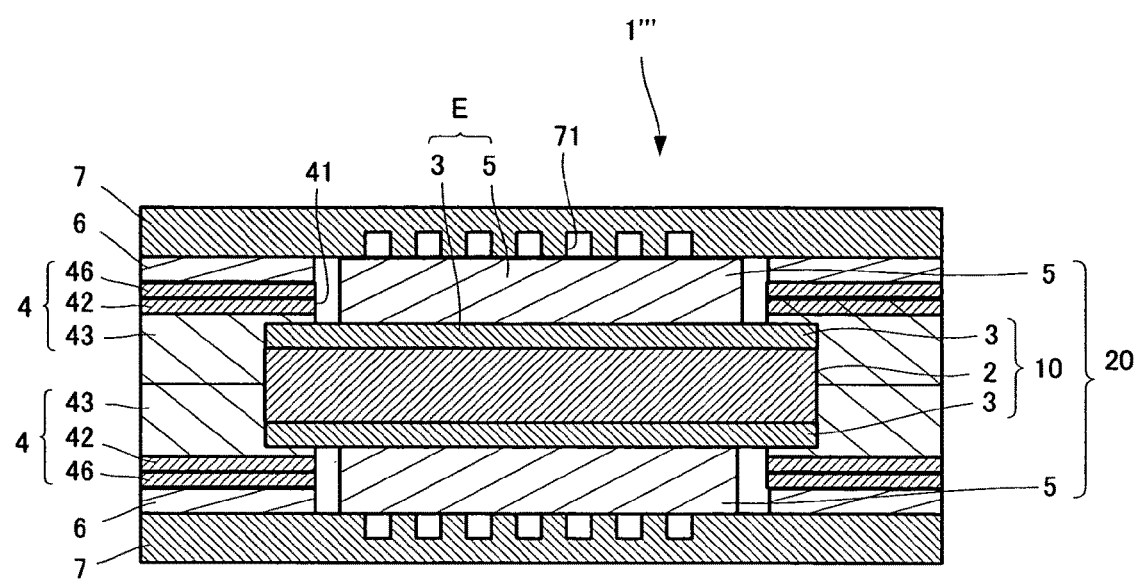
FIG. 14 is a front cross-sectional view showing still another example of the polymer electrolyte fuel cell according to the first embodiment.

A polymer electrolyte fuel cell was prepared in the same manner as Example 12, except that the sizes of the electrolyte membrane 2, transfer sheets 8 for forming catalyst layers, and reinforcing films 4 were changed (see FIG. 14). The electrolyte membrane 2 was cut to a size of 53×53 mm, and each transfer sheet for forming a catalyst layer was cut to a size of 53×53 mm. Each reinforcing film 4 was cut to a size of 80×80 mm.

Example 15

A polymer electrolyte fuel cell according to Example 15 was prepared in the same manner as Example 13 above, except that the materials of the reinforcing films 4 were changed, and the heat-pressing conditions during welding of the reinforcing films 4 to the membrane-catalyst layer assembly 10 were changed. The reinforcing films 4 were the same as those of Example 2. The reinforcing films 4 were centrally aligned on both surfaces of the membrane-catalyst layer assembly 10, and then heat-pressed for 30 seconds at 100° C. and 1.0 MPa to be welded onto the membrane-catalyst layer assembly 10.

Example 16

A polymer electrolyte fuel cell according to Example 16 was prepared in the same manner as the polymer electrolyte fuel cell according to Example 13 above, except that the electrolyte membrane 2 and transfer sheets 8 for forming catalyst layers were cut to a size of 56×56 mm.

Example 17

A polymer electrolyte fuel cell according to Example 17 was prepared in the same manner as the polymer electrolyte fuel cell according to Example 13 above, except that the materials of the reinforcing films 4 were changed, and the pressing conditions during bonding of the reinforcing films 4 to the membrane-catalyst layer assembly 10 were changed.

Pross-Well (manufactured by Nitto Denko Corporation, PW-3610A) was used as the reinforcing films 4 of Example 17. The Pross-Well was composed of a gas barrier layer 42 made of a 25 μm thick polyimide and a first bonding layer 43 made of a 10 μm thick acrylic resin. Pressing during adhesive bonding of the reinforcing films 4 to the membrane-catalyst layer assembly 10 was performed for 30 seconds at room temperature (25° C.) and 0.3 MPa.

Comparative Example 1

Figure 15:
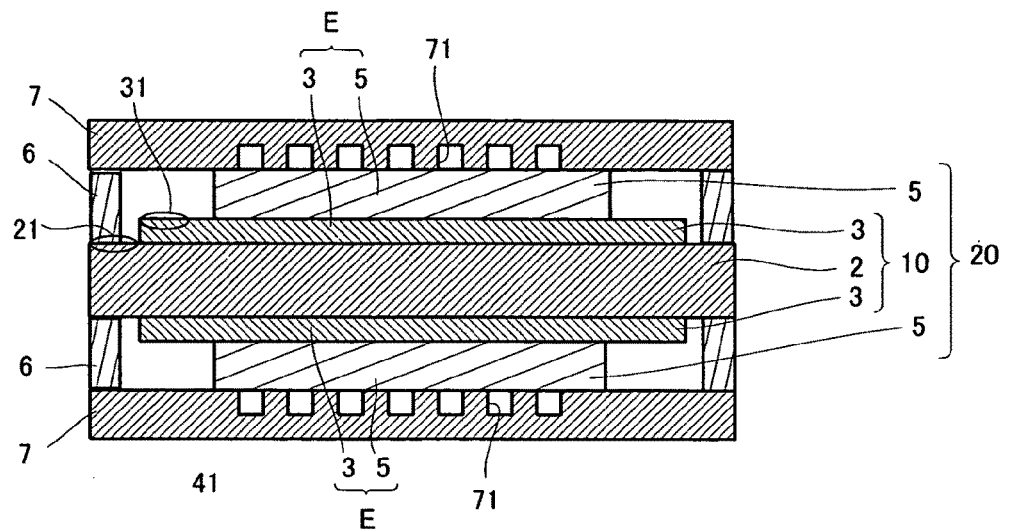
FIG. 15 is a front cross-sectional view showing a polymer electrolyte fuel cell according to Comparative Example 1 or Comparative Example 6.

A polymer electrolyte fuel cell according to Comparative Example 1 was prepared in the same manner as the polymer electrolyte fuel cell according to Example 1 above, except that reinforcing films 4 were not formed, and the thickness of the gaskets 6 was changed. Because reinforcing films 4 were not formed, the gaskets 6 (manufactured by NOK Corp., EPDM, thickness: 300 μm) were located on outer edge portions of the electrolyte membrane 2 (see FIG. 15).

Comparative Example 2

Figure 16:
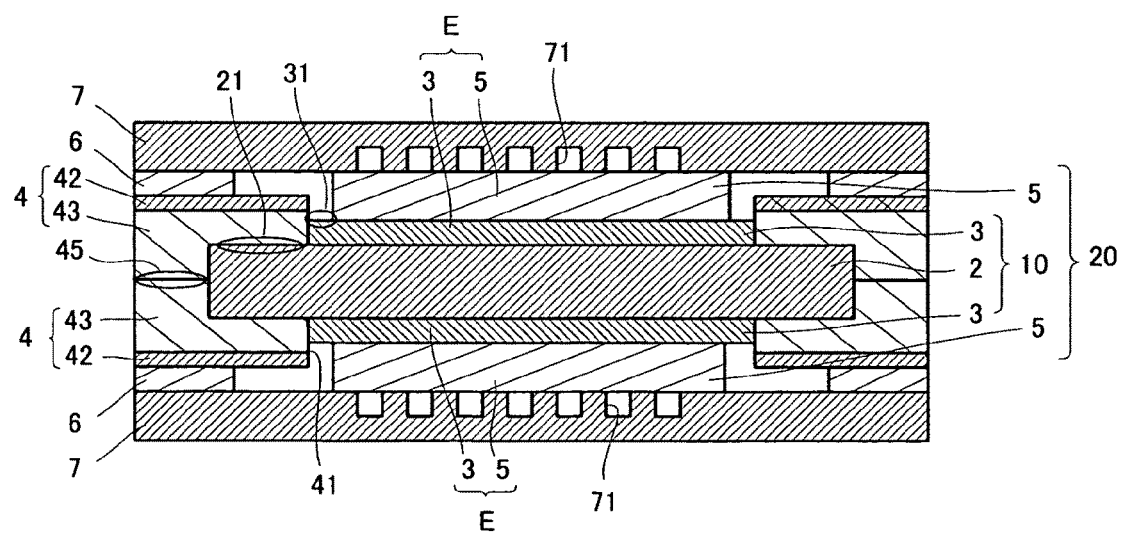
FIG. 16 is a front cross-sectional view showing a polymer electrolyte fuel cell according to Comparative Example 2.

A polymer electrolyte fuel cell according to Comparative Example 2 was prepared in the same manner as the polymer electrolyte fuel cell according to Example 1 above, except that the transfer sheets 8 for forming catalyst layers were cut to a size of 50×50 mm. Because the catalyst layers 3 were 50×50 mm in size, as shown in FIG. 16, the reinforcing films 4 were not formed on the outer edge portions 31 of the catalyst layers 3, but resided only on outer edge portions 21 of the electrolyte membrane 2.

Comparative Example 3

Figure 17:
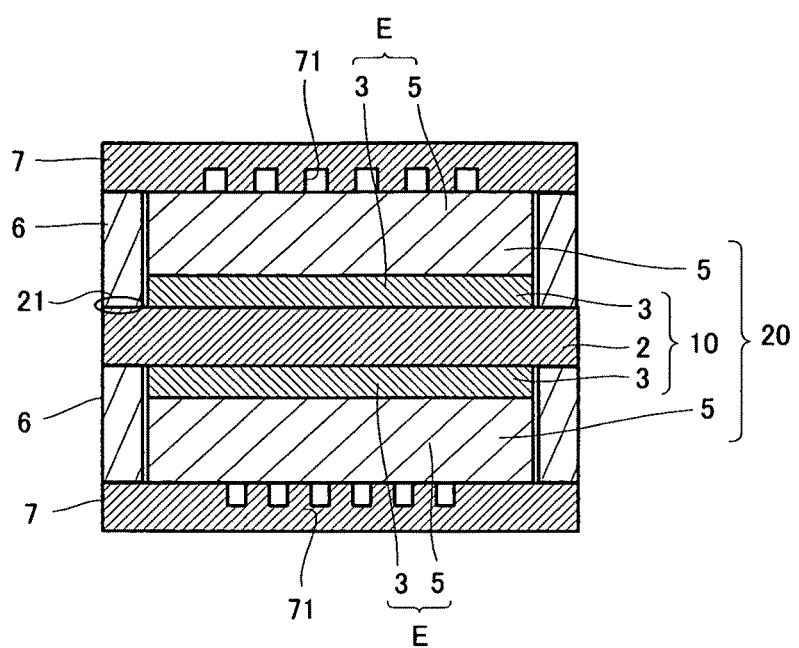
FIG. 17 is a front cross-sectional view showing a polymer electrolyte fuel cell according to Comparative Example 3.

A polymer electrolyte fuel cell according to Comparative Example 3 was prepared in the same manner as the polymer electrolyte fuel cell according to Example 5 above, except that reinforcing films were not formed, the electrodes E were 50×50 mm in size, and the thickness of the gaskets 6 was changed. As shown in FIG. 17, the gaskets 6 (manufactured by NOK Corp., EPDM, thickness: 300 μm) were located on outer edge portions 21 of the electrolyte membrane 2.

Comparative Example 4

A polymer electrolyte fuel cell according to Comparative Example 4 was prepared in the same manner as the polymer electrolyte fuel cell according to Example 5 above, except that each of the reinforcing films 4 consisted only of a first bonding layer 43, without having a gas barrier layer 42. Each of the reinforcing films 4 of Comparative Example 4 consisted only of a first bonding layer 43 made of polypropylene (manufactured by Toray, Torayfan (registered trademark), thickness: 30 μm).

Comparative Example 5

A polymer electrolyte fuel cell according to Comparative Example 5 was prepared in the same manner as the polymer electrolyte fuel cell according to Example 5 above, except that each reinforcing film 4 consisted only of a gas barrier layer 42 without having a first bonding layer 43, and the reinforcing films were not welded to but laminated on the membrane electrode assembly. The reinforcing films 4 of Comparative Example 5 consisted only of a gas barrier layer 42 made of biaxially oriented polyethylene-naphthalate (manufactured by Teijin, Ltd., Teonex, film thickness: 12 μm).

Comparative Example 6

Figure 18:
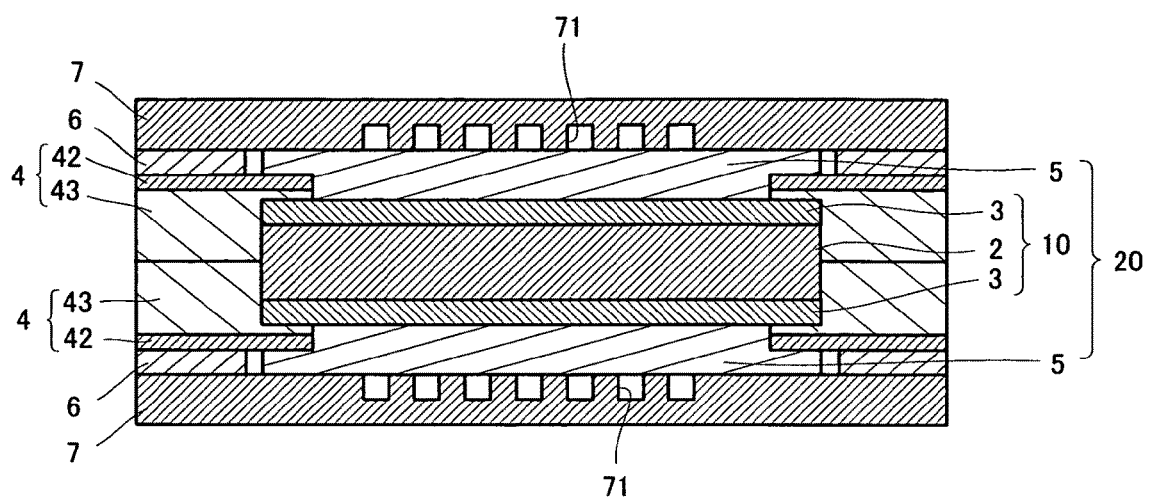
FIG. 18 is a front cross-sectional view showing a polymer electrolyte fuel cell according to Comparative Example 7.

A polymer electrolyte fuel cell according to Comparative Example 6 was prepared in the same manner as the polymer electrolyte fuel cell according to Example 13 above, except that the size and the lamination method of the gas diffusion layers 5 were changed. The gas diffusion layers 5 were cut to a size of 53×53 mm, as with the electrolyte membrane 2 and catalyst layers 3. As shown in FIG. 18, each gas diffusion layer 5 was located on the catalyst layer 3, with the reinforcing film 4 sandwiched therebetween.

Comparative Example 7

Figure 19:
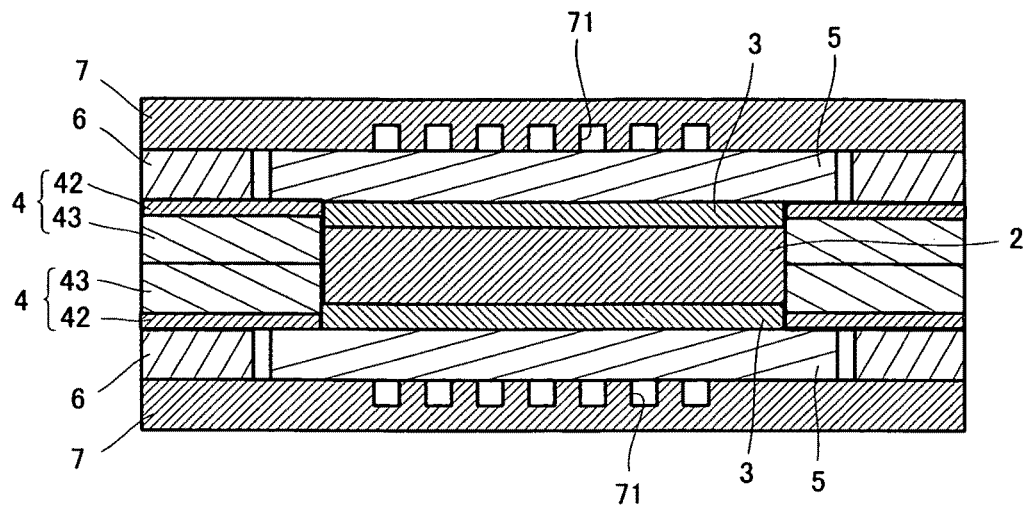
FIG. 19 is a front cross-sectional view showing a polymer electrolyte fuel cell according to Comparative Example 8 or Comparative Example 9.

A polymer electrolyte fuel cell according to Comparative Example 7 was prepared in the same manner as the polymer electrolyte fuel cell according to Example 13 above, except that the gas diffusion layers 5 were cut to a size of 53×53 mm, and the electrolyte membrane 2 and transfer sheets 8 for forming catalyst layers were cut to a size of 50×50 mm (see FIG. 19).

Comparative Example 8

A polymer electrolyte fuel cell according to Comparative Example 8 was prepared in the same manner as the polymer electrolyte fuel cell according to Example 17 above, except that the gas diffusion layers 5 were cut to a size of 53×53 mm, and the electrolyte membrane 2 and transfer sheets 8 for forming catalyst layers were cut to a size of 50×50 mm (see FIG. 19).

Comparative Example 9

Figure 20:
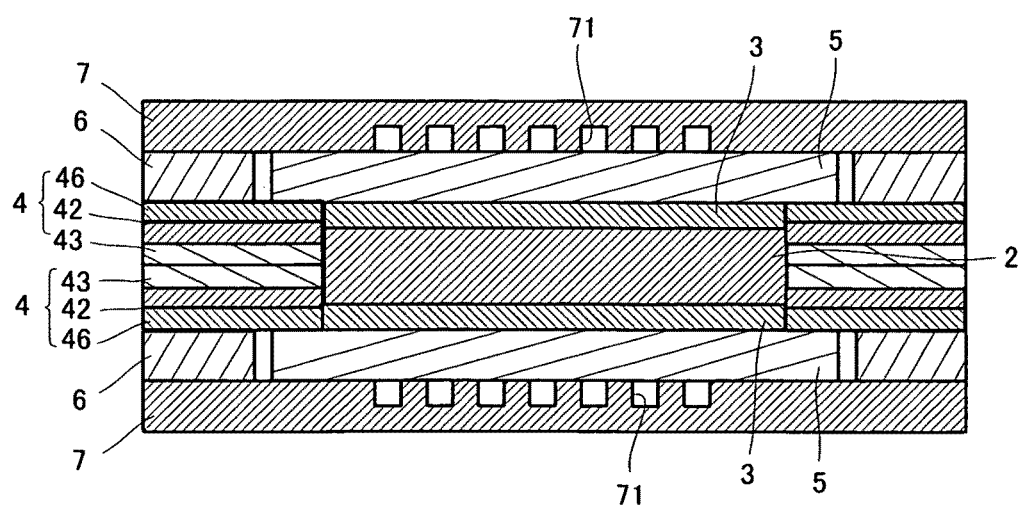
FIG. 20 is a front cross-sectional view showing a polymer electrolyte fuel cell according to Comparative Example 10.

A polymer electrolyte fuel cell according to Comparative Example 9 was prepared in the same manner as the polymer electrolyte fuel cell according to Example 14 above, except that the gas diffusion layers 5 were cut to a size of 53×53 mm, and the electrolyte membrane 2 and transfer sheets 8 for forming catalyst layers were cut to a size of 50×50 mm (see FIG. 20).

(Evaluation Method 1)

The polymer electrolyte fuel cells according to Examples 1 to 17 and Comparative Examples 1 to 9 were subjected to load-change cycle tests. The results are shown in Table 1.

The measurements were conducted at a cell temperature of 80° C., a fuel utilization of 70%, an oxidant utilization of 40%, and a temperature of 50° C. in a humidified environment. In the load-change cycle tests, the cells were subjected to repeated cycles of generating power at a current density of 0.3 A/cm² for 1 minute, and subsequently generating power at a current density of 0.01 A/cm² for 1 minute. Table 1 gives the test results of the durability time, which represents the time until a voltage drop occurs; the presence or absence of a breakage in the electrolyte membrane after the load-change cycle tests; and the amount of leakage current after the load-change cycle tests.

(Evaluation Method 2)

With respect to the cell of Example 11, the membrane electrode assembly with reinforcing films was embedded in an epoxy resin, and the resin-embedded assembly was polished so that the cross section thereof was observable. FIG. 21 shows a scanning electron micrograph of the cross section. The micrograph of FIG. 21 confirmed that, in the membrane electrode assembly with reinforcing films of Example 11, the reinforcing films 4 did not sink into the electrolyte membrane 3 or catalyst layers 3, nor were the electrolyte membrane 2 or catalyst layers 3 deformed.

(Evaluation Method 3)

The polymer electrolyte fuel cells according to Examples 13 to 17 and Comparative Examples 6 to 9 were evaluated for their current-voltage characteristics. Table 1 gives the resistance value and electromotive force measured for each polymer electrolyte fuel cell, using an ohmmeter.

TABLE 1

| | Durability Time (h) | Amount of Leakage Current (mA/cm²) | Membrane Breakage (Visually Observed) | Resistance Value (mΩ) | Electromotive Force (V) |
|---|---|---|---|---|---|
| Ex. 1 | 1600 or more | 1 or less | No | | |
| Ex. 2 | 2000 or more | 1 or less | No | | |
| Ex. 3 | 1000 or more | 1 or less | No | | |
| Ex. 4 | 1000 or more | 1 or less | No | | |
| Ex. 5 | 1600 or more | 1 or less | No | | |
| Ex. 6 | 1600 or more | 1 or less | No | | |
| Ex. 7 | 1000 or more | 1 or less | No | | |
| Ex. 8 | 1000 or more | 1 or less | No | | |
| Ex. 9 | 1000 or more | 1 or less | No | | |
| Ex. 10 | 1000 or more | 1 or less | No | | |
| Ex. 11 | 1000 or more | 1 or less | No | | |
| Ex. 12 | 1000 or more | 1 or less | No | | |
| Ex. 13 | 1600 or more | 1 or less | No | 4.7 | 0.990 |
| Ex. 14 | 1000 or more | 1 or less | No | 5.0 | 0.984 |
| Ex. 15 | 1000 or more | 1 or less | No | 4.8 | 0.995 |
| Ex. 16 | 1000 or more | 1 or less | No | 3.8 | 0.989 |
| Ex. 17 | 1000 or more | 1 or less | No | 4.0 | 0.975 |
| Comp. Ex. 1 | 300 | 20 or more | Yes | | |
| Comp. Ex. 2 | 300 | 20 or more | Yes | | |
| Comp. Ex. 3 | 300 | 20 or more | Yes | | |
| Comp. Ex. 4 | 400 | 20 or more | Yes | | |
| Comp. Ex. 5 | 0 | 20 or more | No | | |
| Comp. Ex. 6 | 100 | 20 or more | Yes | 20.0 | 0.828 |
| Comp. Ex. 7 | 0 | 30 or more | No | 26.7 | 0.350 |
| Comp. Ex. 8 | 0 | 30 or more | No | 47.0 | 0.404 |
| Comp. Ex. 9 | 0 | 30 or more | No | 29.0 | 0.366 |

What is claimed is:

1. A membrane-catalyst layer assembly with reinforcing films comprising:
   a solid polymer electrolyte membrane;
   a catalyst layer formed on each surface of the electrolyte membrane;
   a frame-shaped reinforcing film with a central opening, the reinforcing film being located on each surface of a membrane-catalyst layer assembly having the electrolyte membrane and the catalyst layers, in such a manner that each catalyst layer, except for an outer edge portion thereof, is exposed through the opening;
   a frame-shaped gasket located on each of the reinforcing films;
   a gas diffusion layer formed on each of the catalyst layers inside the opening of each reinforcing film, and having an outer peripheral surface, wherein each said gas diffusion layer is not co-extensive with its associated catalyst layer;
   a separator located on each gas diffusion layer and each frame-shaped gasket;
   each of the reinforcing films comprising a first bonding layer bonded to the membrane-catalyst layer assembly, and a gas barrier layer formed on the first bonding layer to prevent passage of a fuel gas and an oxidant gas;
   an outer edge portion of each first bonding layer of each reinforcing film being located outside an outer edge of the electrolyte membrane, the outer edge portions being bonded together;
   each of the first bonding layers being bonded to the outer edge portion of each catalyst layer and the outer edge portion of the electrolyte membrane; and
   each of the first bonding layers and each of the gas barrier layers extending so as to overlap the outer edge portion of each catalyst layer;
   each catalyst layer and each gas diffusion layer constituting an electrode;
   each electrode is spaced apart from, but surrounded about its periphery by, a respective one of said frame-shaped gaskets located on its associated said reinforcing film, wherein each said associated reinforcing film does not abut against the periphery of each said gas diffusion layer so that a gap is defined in which a portion of the surface of each said catalyst layer is exposed;
   an opening of each gasket being larger than the opening of each reinforcing film; and
   the surface of each gasket and the surface of each gas diffusion layer being located at substantially the same height, and each separator being located on the surfaces thereof.

2. The membrane-catalyst layer assembly with reinforcing films according to claim 1, wherein the first bonding layers are adhesive-bonded to the membrane-catalyst layer assembly.

3. The membrane-catalyst layer assembly with reinforcing films according to claim 1, wherein each of the reinforcing film further comprises a second bonding layer formed on the gas barrier layer, and a gasket is bonded on the second bonding layer.

4. The membrane-catalyst layer assembly with reinforcing films according to claim 3, wherein:
   the first bonding layer is welded to the membrane-catalyst layer assembly;
   the second bonding layer is welded to the gasket; and
   the first bonding layer has a melting point lower than that of the second bonding layer.

5. The membrane-catalyst layer assembly with reinforcing films according to claim 1, wherein each of the catalyst layers is formed on each surface of the electrolyte membrane, except for an outer edge portion of the electrolyte membrane.

6. The membrane-catalyst layer assembly with reinforcing films according to claim 1, wherein each of the catalyst layers is formed on an entirety of each surface of the electrolyte membrane.

7. The membrane-catalyst layer assembly with reinforcing films according to claim 1, wherein each said gas diffusion layer has a thickness equal to or greater than that of the reinforcing film and comprises a porous conductive substrate.

8. The membrane-catalyst layer assembly with reinforcing films according to claim 1, wherein each said gap has a width of greater than 0 mm but not greater than 5 mm.

* * * * *